Figure 1:
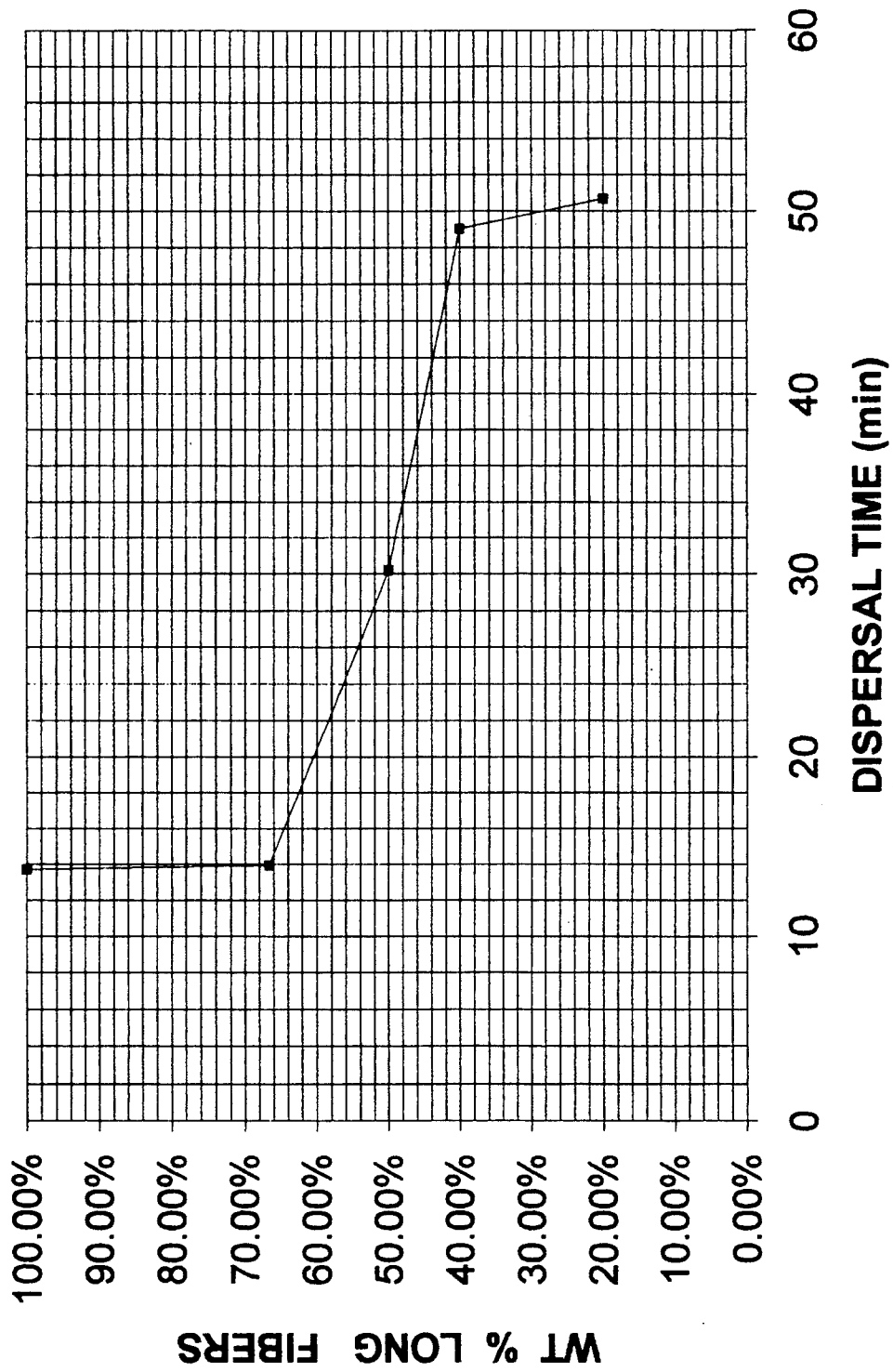

United States Patent [19]

Goldman et al.

[11] Patent Number: 5,346,541
[45] Date of Patent: Sep. 13, 1994

[54] WATER DISPERSIBLE FORMULATIONS AND MATERIALS AND METHODS FOR INFLUENCING THEIR WATER DISPERSIBILITY

[75] Inventors: Leonard J. Goldman; Susan M. Roesch, both of Gainesville, Fla.

[73] Assignee: Net/Tech International, Inc., Baldwin, N.Y.

[21] Appl. No.: 978,219

[22] Filed: Nov. 18, 1992

[51] Int. Cl.$^5$ ............................. C08L 1/00; C08L 1/26
[52] U.S. Cl. ................................. 106/163.1; 106/169; 106/197.1; 106/197.2; 106/198; 106/203; 106/204; 536/84; 536/95; 536/97
[58] Field of Search ................. 106/197.1, 197.2, 198, 106/163.1, 169, 203, 204, 169; 536/84, 95, 97

[56] References Cited

U.S. PATENT DOCUMENTS

| | | | |
|---|---|---|---|
| 3,376,285 | 4/1968 | Callihan et al. | 106/197.2 |
| 3,455,714 | 7/1969 | Bishop et al. | 106/197.2 |
| 5,025,004 | 6/1991 | Wu et al. | 106/197.2 |
| 5,110,525 | 5/1992 | Kolsky et al. | 106/197.1 |
| 5,189,152 | 2/1993 | Hinterholzer et al. | 106/198 |

FOREIGN PATENT DOCUMENTS

| | | |
|---|---|---|
| 1103389 | 2/1968 | United Kingdom . |
| 1269622 | 4/1972 | United Kingdom . |
| 1137096 | 10/1974 | United Kingdom . |
| 2052544 | 3/1983 | United Kingdom . |
| 91/17210 | 11/1991 | World Int. Prop. O. ....... 106/197.2 |

*Primary Examiner*—Anthony Green
*Attorney, Agent, or Firm*—Henry D. Coleman; R. Neil Sudol

[57] ABSTRACT

The present invention relates to unexpected or surprising discoveries in the field of biodegradable, water-dispersible formulations and materials and methods for influencing their rate of dispersibility in water. In particular, the present invention relates to the unexpected discovery that the inclusion of effective amounts of short length cellulose fibers dispersed throughout a water soluble cellulose ether binder will result in a retardation or slowing of the water dispersibility of the formulation relative to a formulation containing long or long and short cellulose fibers in a cellulose ether binder. In an additional aspect, the present invention relates to the discovery that the inclusion of effective amounts of long length cellulose fibers dispersed throughout a water soluble cellulose ether binder will result in an enhancement or hastening of the water dispersibility of the formulation relative to a formulation containing a cellulose ether binder which does not contain long cellulose fibers. In still a further aspect, the present invention relates to the discovery that the inclusion of effective amounts of a gas-releasing agent increases the rate of water-dispersibility relative to formulations containing only a cellulose ether binder.

43 Claims, 18 Drawing Sheets

Dispersal Time as a Function of Sample Thickness: Sodium Bicarbonate and Citric Acid Added Effect of Peroxide Addition on HPC Binder Effect of Sodium Bicarbonate & Acetic Acid on HPC Binder

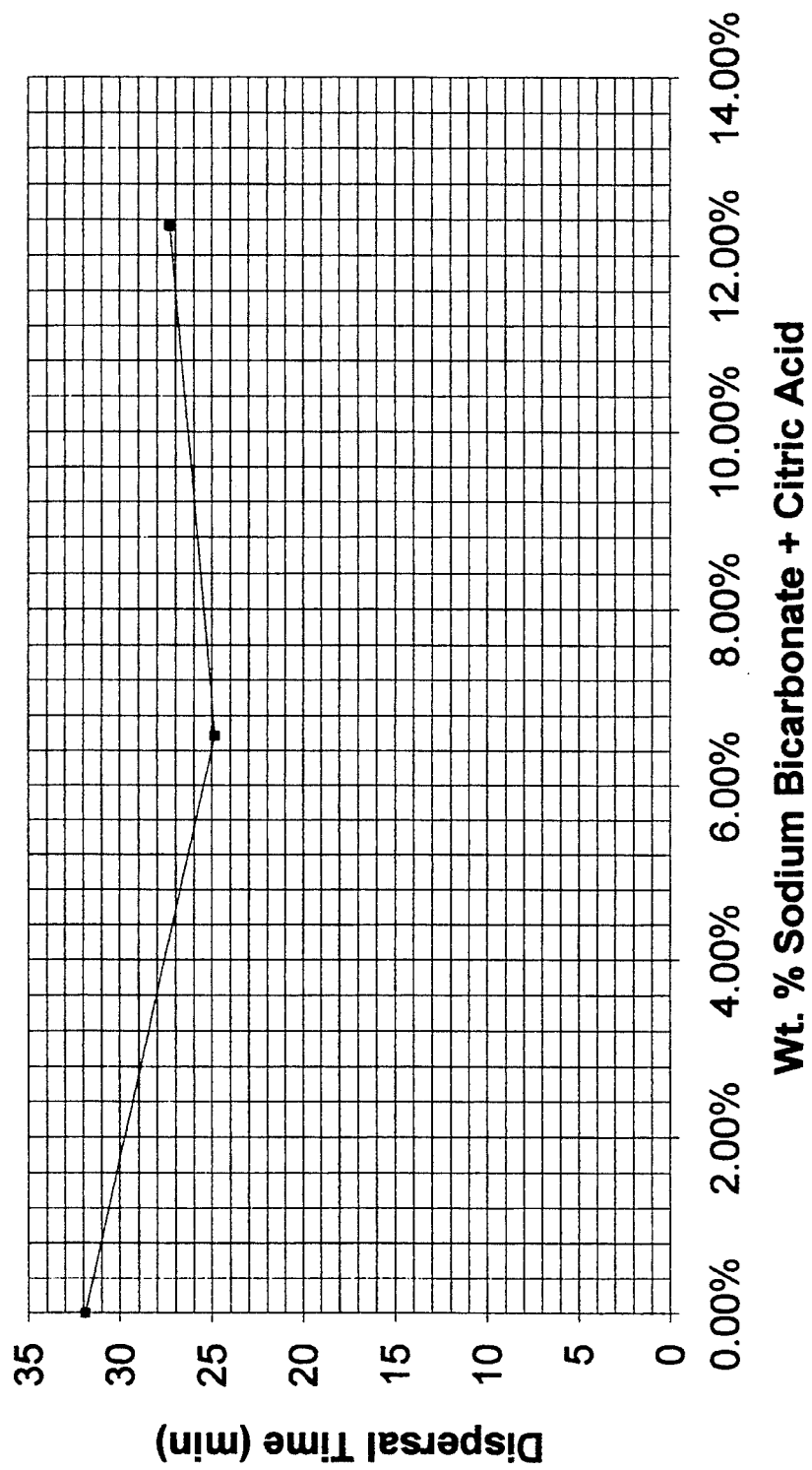

WATER DISPERSIBLE FORMULATIONS AND MATERIALS AND METHODS FOR INFLUENCING THEIR WATER DISPERSIBILITY

FIELD OF THE INVENTION

The present invention relates to unexpected or surprising discoveries in the field of biodegradable, water-dispersible formulations and materials and methods for influencing their rate of dispersibility in water.

In particular, the present invention relates to the discovery that the inclusion of effective amounts of long length cellulose fibers dispersed throughout a water soluble cellulose ether binder will result in an enhancement or hastening of the water dispersibility of the formulation relative to a formulation containing only a cellulose ether binder.

In another aspect, the present invention relates to the unexpected discovery that the inclusion of effective amounts of short length cellulose fibers dispersed throughout a water soluble cellulose ether binder will result in a retardation or slowing of the water dispersibility of the formulation relative to a formulation containing long cellulose fibers.

In still a further aspect, the present invention relates to the discovery that the inclusion of effective amounts of a gas releasing agent in formulations containing a cellulose ether binder produces a foaming action which produces increased water dispersibility relative to formulations which do not contain gas releasing agent.

BACKGROUND OF THE INVENTION

A number of articles used in the healthcare and food industries including bedpans, urine bottles, sputum cups and other containers used in hospitals, clinics and similar institutions and many food contains are conventionally made of steel and/or plastic. The steel containers are washed and reused, while the plastic containers are generally discarded. It is to be noted that such plastic receptacles are not biodegradable and contribute significantly to the world's mounting waste disposal problems. As an alternative, many of these articles may be manufactured from paper mâché or reconstituted paper pulp so that, after use by a patient, a container with its contents can be deposited inside a waste disposal machine and reduced to a coarse slurry through a combined wetting and mechanical action. The slurry is then washed down a drain into the local sewage system.

Separately, many articles of use which are manufactured from paper may be more easily and efficiently discarded and degraded if the articles are made of a water dispersible material. Thus, instead of placing the articles in landfills or other dumping grounds, the articles could be handled much as raw sewage is handled. Moreover, even if these articles are placed in landfills, the amount of time required for breakdown into biodegradable subunits is enhanced relative to paper products.

It has been proposed to manufacture water dispersible disposable containers from a mixture of cellulose powder, glass in powder or fibrous form and cellulose ether. The mixture of dry ingredients is combined with water and a resulting dough molded into the shape of a desired article such as a container. Although articles manufactured pursuant to this proposed process are satisfactory for many purposes, a need has been recognized for containers with an enhanced or accelerated water dispersibility. In addition, a clear need exists in the art for general chemical methods for influencing the dispersibility of water dispersible articles and in some instances to slow or retard dispersibility.

Water dispersible articles should be sufficiently strong to provide support for the intended use of the article. In addition, the containers must be essentially completely water dispersible so as to wash cleanly through conventional sewage and waste disposal systems.

OBJECTS OF THE INVENTION

An object of the present invention is to provide improved water dispersible formulations for manufacturing water dispersible articles.

Another object of the present invention is to provide methods for enhancing the rate of water dispersibility of formulations according to the present invention.

Still an additional object of the present invention is to provide a method for decreasing or inhibiting the rate of dispersibility of water dispersible formulations according to the present invention.

Still a further object of the present invention is to present a method for influencing the rate of water dispersibility in water dispersible formulations according to the present invention using additives which are themselves biodegradable or which readily degrade into biodegradable components.

Yet another object of the present invention is to provide a method for making water dispersible formulations according to the present invention.

BRIEF DESCRIPTION OF THE INVENTION

In one aspect according to the present invention relates to novel water dispersible formulations which include short and/or long cellulose fibers for influencing the water dispersibility of the formulations. It has unexpectedly been discovered that the inclusion of certain weight percentages of either long and/or short cellulose fibers can produce materials which evidence strength, great structural integrity and water dispersibility. In addition, sizing the cellulose fibers according to the present invention can dramatically influence the water dispersibility of water soluble cellulose ether binders.

In a further aspect according to the present invention which includes cellulose fibers, a water dispersible formulation consists essentially of about 1% to about 90% by weight of at least one water soluble or water dispersible cellulose ether binder and at least about 10% to about 99% by weight of cellulose fibers having a length less than about 300 microns. Preferably, the water soluble cellulose ether binder comprises about 3% to about 62% by weight of the formulation and most preferably ranges from about 3% to about 30% by weight of the formulation. It has unexpectedly been discovered that the inclusion of significant quantities of these "short" cellulose fibers randomly dispersed in a water dispersible cellulose ether binder matrix dramatically decreases the water dispersibility of water soluble cellulose ether binders relative to formulations containing long cellulose fibers. This is a surprising result. In addition, it has been unexpectedly discovered that as the amount of short cellulose fibers in a given formulation containing both long and short or only long cellulose fibers is increased, the water dispersibility decreases markedly.

In this aspect according to the present invention in which short cellulose fibers are added to a cellulose ether binder matrix, gas releasing agents in effective amounts may be added to the formulations.

In a related aspect according to the present invention, a water dispersible formulation comprises about 1% to about 90% by weight of at least one water soluble cellulose ether binder and at least about 10% to about 99% by weight of long cellulose fibers ranging in length from greater than about 300 microns to about 2 millimeters or more. Preferably, the water soluble or water dispersible cellulose ether binder comprises about 3% to about 62% by weight of the formulation and most preferably ranges from about 3% to about 30% by weight of the formulation. It has unexpectedly been discovered that the inclusion of significant quantities of these "long" cellulose fibers dramatically increases the water dispersibility of water soluble cellulose ether binders. In addition, it has been unexpectedly discovered that as the amount of long cellulose fibers in a given formulation containing short and/or long cellulose fibers is increased, its water dispersibility increases dramatically.

In this aspect according to the present invention in which long cellulose fibers are added to a cellulose ether binder matrix, gas releasing agents in effective amounts may be added to the formulations.

In a further aspect according to the present invention, a water dispersible formulation comprises about 75% to about 99.99% by weight of a water soluble cellulose ether binder and about 0.01% to about 30% and preferably about 0.1% to about 15% of a gas releasing agent. In the case of peroxide gas releasing agents, these most preferably comprise about 0.3% to about 0.7% by weight of the water dispersible formulation. It is noted that the effect on dispersal rate is a function of the type of gas releasing agent used. It is further noted that depending upon the amount and type of gas releasing agent used, dispersal times may actually increase dramatically relative to the use of water soluble cellulose ether binders alone. Cellulose fibers (long or short) may also be added to the formulations according to this aspect of the present invention to influence the rate of dispersibility in water.

In yet another aspect according to the present invention, a water dispersible formulation consists essentially of about 95% to about 99.99% by weight of a water soluble cellulose ether binder selected from the group consisting of carboxymethylcellulose (CMC) and carboxylmethylhydroxyethylcellulose (CMHEC) in combination with a gas releasing agent in the form of a peroxide, preferably hydrogen peroxide ranging in weight from about 0.01% to about 5% by weight of the formulation. Optional additives for use in this aspect according to the present invention include short and/or long cellulose fibers in amounts generally ranging from about 10% to about 99% by weight of the formulation with corresponding decreases in the weight percentages of binder and gas releasing agent included in the formulations. The addition of short and/or long cellulose fibers may be used to influence the rate of water dispersibility of formulations according to the present invention. Other common additives such as inert fillers, pigments, plasticizers, flavors and fragrances, among others may also be included. In this aspect according to the present invention, the inclusion of hydrogen peroxide at weight ratios no greater than about 20% by weight of the cellulose ether binder (CMC or CMHEC) included in the formulation results in an enhancement in the rate of water dispersibility. The inclusion of hydrogen peroxide in an amount greater than about 20% by weight of a cellulose ether binder selected from carboxymethylcellulose and carboxymethylhydroxyethylcellulose unexpectedly results in an inhibition in the rate of water dispersibility.

DETAILED DESCRIPTION OF THE INVENTION

The following definitions of terms will be used throughout the specification.

The term "by weight" is used throughout the specification to describe that amount of a component which is added to a formulation based upon the dry weight of the formulation.

The term "cellulose" is used throughout the specification to describe any composition having the formula $(C_6H_{10}O_5)^n$, where n is an integer greater than 5.

The term "cellulose fiber" is used throughout the specification to describe fibers made of cellulose which are added to the water dispersible cellulose ether binder to provide strength and integrity to the material and to influence the rate of water dispersibility of the materials.

The term "short cellulose fiber" or "short fiber" is used throughout the specification to describe cellulose fibers which are less than about 300 microns in length and most preferably range from about 22 microns to about 280 microns in length. As used in the present invention, when short cellulose fibers are incorporated into formulations according to the present invention, these short cellulose fibers used preferably consist essentially of fibers having lengths less than about 300 microns. It will be understood by one of ordinary skill in the art that minor quantities of cellulose fibers having lengths greater than 300 microns may be used without dramatically affecting the overall impact on dispersibility that occurs when short cellulose fibers are added. Short cellulose fibers useful in the present invention may be processed from one or a mixture of plant, preferably, tree species. In the present invention, preferred short cellulose fibers for use in the present invention include those obtained from Fiber Sales and Development Corporation, Urbana, Ohio under the tradename Solka-Floc.

The term "long cellulose fiber" or "long fiber" is used throughout the specification to describe cellulose fibers which are greater than about 300 microns in length and most preferably range from about 300 microns to 2 mm or more in length. As used in the present invention, when long cellulose fibers are incorporated into formulations for enhancing the water dispersibility of the water soluble cellulose binders, these long fibers used consist essentially of fibers having lengths greater than about 300 microns. One of ordinary skill in the art will understand that minor quantities of cellulose fibers having lengths shorter than 300 microns may be used without dramatically impacting the overall enhancement of dispersibility that occurs when long cellulose fibers are added. Exemplary long cellulose fiber for use in the present invention are derived primarily from wood pulp (although other types of fiber derived from other plant material may also be used). Examples of such wood pulp include wood pulp derived from soft and hard wood, for example, Leaf River 90 Softwood (Leaf River, Ala.), Brunswick Prime Softwood (Brunswick, Ga.), Ashdown Prime Softwood (Ashdown Ark.), Brunswick E-100 (Brunswick, Ga.), Puget Fluff and Puget Ultra, (Bellingham, Wash.), Ashwood Prime Hardwood (Ashdown, Ala.), Palatka Prime Hardwood (Woodland, Me.) and Woodland St. Croix Hardwood (Woodland, Me.). Suppliers of cellulose fibers for use in the present invention include Georgia-Pacific Corporation, Atlanta, Ga., James River Corporation, Richmond Va., Westvaco of Wickliffe, Ky., Weyerhauser Corp., Tacoma, Wash., Great Northern Nekoosa of Atlanta, Ga. and Potlatch Corporation, San Francisco, Calif. Chemically debonded pulps may also be used in the present invention.

The term "water soluble cellulose ether" is used throughout the specification to describe water soluble or water dispersible cellulose ether materials which can be used as binders in the present invention. Water soluble cellulose ethers for use in the present invention include, for example, carboxymethylcellulose (CMC), hydroxypropylcellulose (HPC), hydroxypropylmethylcellulose (HPM), hydroxyethylcellulose (HEC), methylcellulose (MC), hydroxymethylethylcellulose (HMEC) and carboxylmethylhydroxyethylcellulose (CMHEC) and any related cellulose ether derivative which is readily soluble or dispersible in water. These binder materials are readily available from a number of chemical distributors including Aqualon, Dow Chemical Co. and Union Carbide under such tradenames as carboxymethylcellulose "7LXF" and hydroxypropylcellulose "Klucel Type GF", hydroxypropylmethylcellulose "Methocel F50" and hydroxyethylcellulose "Cellosize QP 4400-H". The cellulose ether binders which are used in the present invention preferably range in molecular weight from about 100,000 to about 500,000. Above a molecular weight of 500,000, the cellulose ether binders are limited because they produce solutions/dispersions of high viscosity and have low water dispersibility.

The term "gas-producing agent" or "gas-releasing agent" is used throughout the specification to describe an agent which, when added to a cellulose ether binder, releases a gas such as oxygen, carbon dioxide, nitrogen, ammonia and hydrogen, among other gases. While not being limited by way of theory, it is believed that the result of the addition of effective amounts of a gas-releasing agent to formulations according to the present invention is to release gas and produce a "foaming action." This foaming action, in turn, produce pores throughout the interstices of the cellulose ether binder matrix. The result is a formulation with substantially enhanced water dispersibility and surprising strength and structural integrity. Gas releasing agents for use in the present invention include, for example, peroxides (which release oxygen), especially hydrogen peroxide, hydrides (which release hydrogen), azo compounds such as azoisobutyronitrile (AIBN) which release nitrogen at elevated temperatures, urea and urea-like agents which release ammonia gas, bicarbonates such as sodium and potassium bicarbonate, among others, and carbonates such as ethylene carbonate, propylene carbonate and sodium and potassium carbonate which will release substantial quantities of carbon dioxide alone (at elevated temperature) or when exposed to an acid. It is noted that for purposes of the present invention, calcium carbonate without a sufficiently strong acid is not a gas releasing agent. It has been found that calcium carbonate will release gas at temperatures which are too high to be compatible for use in the present invention. Preferred gas releasing agents for use in the present invention include peroxides, especially including hydrogen peroxide and a salt of bicarbonate such as sodium or potassium bicarbonate in combination with a biodegradable, biologically compatible organic acid such as citric acid, among others.

The term "peroxide gas releasing agent" is used throughout the specificatin to describe an agent containing a peroxide group or moiety which releases gas and produces a foaming action during manufacture of water dispersible formulations which is responsible for the increase in water dispersibility.

The term "effective amount" is used throughout the specification to describe that amount of a component added to the formulations according to the present invention to produce an intended result or to provide a certain characteristic to formulations according to the present invention.

The term "substantially" is used throughout the specification to describe a change in the rate of water dispersibility or other characteristic of the water dispersible materials according to the present invention. In particular, a substantially increased or decreased water dispersibility or other characterisitic is a dispersibility or other characteristic which is measurably increased or decreased relative to a comparison formulation unrelated to the instant invention.

It has unexpectedly been discovered in the instant invention that the inclusion of certain weight percentages of cellulose fibers having a particular length distribution above or below about 300 microns, will substantially enhance or inhibit the water dispersibility of a binder matrix consisting essentially of a water dispersible cellulose ether and long and/or short cellulose fibers.

In particular, in this aspect according to the present invention, a composition consists essentially of about 1% to about 90% by weight of a water dispersible cellulose ether binder in combination with about 10% to about 99% by weight of cellulose fibers. It has been unexpectedly discovered that the inclusion of at least about 10% by weight cellulosic fibers dispersed randomly throughout a water dispersible cellulose ether binder matrix provides for a water dispersible material which has surprising strength and great structural integrity without the need for adding other structural fillers used in the prior art, for example, glass wool and related glass fibers.

In certain preferred aspects according to the present invention, an effective amount of at least one gas releasing agent is preferably added to the cellulosic fibers and water dispersible cellulose ether binder matrix. Such formulations may also include additional additives such as inert fillers, including calcium carbonate, talc, clay powder and $TiO_2$, plastizers, insolubilizers or cross-linking agents, surfaces and dispersal agents, fragrances, flavors and coloring agents.

It further has been discovered that the inclusion of sized cellulose fibers in water dispersible cellulose ether binders can dramatically influence the water dispersibility of the formulation. Using the method according to the present invention, the water dispersibility of materials can be widely varied. The advantage to this method is that numerous water dispersible materials can be manufactured suited to a wide variety of purposes based upon varying dispersibility rates.

In the present invention it has been discovered that the inclusion of about 10% to 99% by weight of cellulose fibers consisting essentially of fibers ranging in length from about 300 microns to about 2 mm or more in a material containing long and/or short cellulose fibers and about 1% to about 90% by weight of at least one water dispersible cellulose ether binder will dramatically increase the water dispersibility of the material. It has also been unexpectedly discovered that the inclusion of effective amounts of at least one gas releasing agent into the above-described water dispersible materials will also dramatically influence the water dispersibility of these materials.

It has also been discovered that the inclusion of about 10% to about 99% by weight of cellulose fibers consisting essentially of short cellulose fibers having lengths less than about 300 microns (preferably ranging from about 22 microns to about 280 microns) in a material containing short and/or long cellulose fibers in combination with about 1% to about 90% by weight of at least one water dispersible cellulose ether binder will dramatically increase the water dispersibility of the material. It has also been unexpectedly discovered that the inclusion of effective amounts of at least one gas releasing agent in the above-described water dispersible materials will also dramatically influence the water dispersibility of these materials.

Preferably, the long and/or short cellulose fibers are included in formulations according to the present invention in an amount ranging from about 38% to about 97% by weight and most preferably are included in amounts ranging from about 70 to about 97% by weight. While these weights of cellulose fibers serve as useful guides to produce formulations according to the present invention which consist essentially of cellulose fibers and water dispersible cellulose ether binder, one of ordinary skill in the art will recognize that the amount of each of the components added to formulations according to the present invention may be varied outside of these ratios when other additives are included. Cellulose fibers for use in the present invention include products which are derived from plants and/or wood pulp. These products are processed for use according to fiber size and are available from a number of well known suppliers.

While not being limited by way of theory, it is believed that the unexpected dramatic increase in water dispersibility imparted by the inclusion of an effective amount of long cellulose fibers is the result of "wicking", i.e. the drawing of water along the length of the cellulose fibers into the interstices of the cellulose ether matrix. By drawing water quickly into remote areas of the binder, this "wicking" phenomenon appears to be responsible for dramatically increasing the exposure of the binder to water. The result is enhanced water dispersibility as the binder disperses apart. Conversely, it is believed that the inclusion of an effective amount of short cellulose fibers to the cellulose ether binder serves as a barrier to water and actually inhibits the water from moving into the interstices of the cellulose ether matrix. Thus, unlike the result that occurs with long cellulose fibers, the result that occurs by including short cellulose fibers is the opposite. It appears as if the shortness of the cellulose fibers produces a phenomenon in which water which comes into contact with the short cellulose fibers is actually held in place (its migration is inhibited) because of hydrogen bonding or other interaction that occurs between the water and cellulose fibers. By adding short cellulose fibers, this tends to inhibit migration of water and also may increase packing density ("packing factor"). Long cellulose fibers are able to overcome the tendency of the cellulose to hydrogen bond with the water simply by virtue of their length and the strength of the wicking phenomenon.

In a further aspect according to the present invention, formulations are presented which include an effective amount of a gas releasing agent in combination with a water dispersible cellulose ether binder. It has unexpectedly been discovered that the inclusion of effective amounts of a gas releasing substance in formulations containing a water dispersible cellulose ether binder dramatically influences the rate of water dispersibility of the formulations.

Effective amounts of gas releasing agents for use in the present invention include about 0.01% to about 30% by weight of the water dispersible formulation in combination with about 70% to about 99.99% by weight of a water soluble cellulose ether binder. Preferably, the gas releasing agent comprises about 0.1% to about 10% by weight. In the case of the use of hydrogen peroxide as the gas releasing agent, it comprises most preferably about 0.3% to about 0.7% by weight of the formulation.

In this aspect of the present invention which includes a gas releasing agent, when the formulation also includes cellulose fibers, the formulation comprises about 1% to about 90% by weight of a water dispersible cellulose ether binder, about 10% to about 98.99 by weight cellulose fibers and about 0.01% to about 30% by weight of a gas releasing agent.

Gas releasing agents for use in the present invention include, for example, peroxides (which release oxygen), especially hydrogen peroxide, hydrogen releasing agents such as hydrides, nitrogen releasing agents such as azo compounds, for example, azoisobutyronitrile (AIBN), ammonia gas releasing agents such as urea and urea-like agents, carbon dioxide releasing agents including bicarbonates such as sodium and potassium bicarbonate, among others, and carbonates such as ethylene carbonate, propylene carbonate and sodium and potassium carbonate, among others.

In the case of the use of gas releasing agents in the form of peroxides, hydrogen peroxide is preferred because of its tendency to release oxygen at room temperature during mixing for a short period of time during manufacture of the formulation. Other peroxides may also be included in the formulations of the present invention. The release of oxygen from peroxides other than hydrogen peroxide, however, may require a heat step.

Other preferred gas releasing agents for use in the present invention include combinations of a salt of bicarbonate, for example sodium or potassium bicarbonate or a salt of carbonate, such as sodium or potassium carbonate. Although these agents may release carbon dioxide at elevated temperatures, it is generally much more preferable to combine these agents with an acid, preferably a biodegradable organic acid such as citric acid or acetic acid. The acid and gas releasing agents are combined preferably in molar ratios ranging from about 1:10 to about 10:1 (acid to gas releasing agent) and most preferably in about a 1:1 molar ratio. In certain instances, especially, for example, using hydroxypropylcellulose as the binder, the acid added to the bicarbonate or carbonate must be sufficiently acidic to drive the formation of carbon dioxide gas. Without sufficient acid or other steps to promote the release of gas from the gas releasing agent, the gas releasing agent (and in particular, the bicarbonate/citric acid mixture), may function to decrease water dispersibility. It is noted that calcium carbonate (without a sufficiently strong acid) is not a gas releasing agent for purposes of the instant invention inasmuch as this agent alone will require extremely high temperatures for release of carbon dioxide inconsistent with the stability of the cellulose ethers.

Other gas releasing agents may also be included in formulations according to the present invention, but these agents are generally less preferred than hydrogen peroxide or a salt of bicarbonate/carbonate in combination with a biodegradable organic acid. Many of these gas releasing agents require a heat step in order to promote the release of gas into the binder matrix, which, depending upon the process used to manufacturing the formulation, may be less preferred because of the tendency of the cellulose ether binders to degrade when exposed to heat.

In most instances, with most of the cellulose ether binders utilized in the present invention and at the weight ratios generally described herein, the inclusion of gas releasing agents produces a substantial increase in water dispersibility. However, in the case of carboxymethylcellulose and carboxylmethylhydroxyethylcellulose, it unexpectedly has been found that the inclusion of peroxide gas releasing agents, in particular at a weight ratio of about 20% of the amount of CMC or CMHEC included in the formulation, may produce an actual decrease in water dispersibility.

While not being limited by way of theory, it is believed that the inclusion of gas releasing agents in formulations during the manufacturing process will result in the release of gas. This release of gas generally produces pores or gas pockets in the cellulose ether binder matrix. After manufacture, the pores or gas pockets which appear throughout the cellulose ether binding matrix will generally aid water dispersibility, by increasing the surface of the binder matrix coming into contact with water and allowing the water to more deeply penetrate the interstices of the binder matrix than would otherwise occur without the inclusion of the gas releasing agent.

In the method of making formulations according to the present invention, to take advantage of the gas releasing agent's ability to produce foaming, it is preferred that during formulation, after the addition of water and gas releasing agent to the mixture (which may include cellulose ether alone or in combination with cellulose fibers and optionally, other additives) the resulting thoroughly mixed dough is thereafter further mixed and/or heated gently in an effort to release gas and produce a foaming action. It is noted that although gentle heating may be appropriate for producing foaming action which will result in increased water dispersibility, heating at temperatures above about 140° C. for any length of time may result in degradation of the cellulose ether binders and other components.

In the case of the inclusion of relatively high concentrations of peroxide gas releasing agents and in particular, hydrogen peroxide in weight ratios of at least about 20% by weight of a cellulose ether selected from carboxymethylcellulose and carboxymethylhydroxyethylcellulose, it has unexpectedly been found that water dispersibility of these formulations decreases relative to formulations containing no peroxide. It is believed that at relatively high concentrations of peroxide, any tendency to form gaseous pores may be counteracted by the interaction of the peroxide and carboxy group which are believed to form a complex which renders the cellulose ether binder significantly less water dispersible.

The formulations according to the present invention may also include substantially inert fillers such as calcium carbonate, talc, clay powder and $TiO_2$. These fillers are added to provide bulk and in certain cases strength to the materials according to the present invention. The $TiO_2$ may be added to the formulations to provide a white color to the article ultimately manufactured from the formulations. These fillers are generally added to the formulations in amounts ranging from about 0.1% to about 80% or more, with a preferred range of about 20% to about 30%. It is noted that as the amount of the above filler added to the formulations is increased, the formulations in the dry state will obtain more of a ceramic-like feel. This characteristic may or may not be desirable, depending upon the ultimate characteristics or water dispersibility desired in the final material.

In addition to fillers, the formulations may also include at least one plasticizer in an amount effective to provide adequate flexibility to the article made from the desired formulation. When included, plasticizers generally comprise about 0.1% to about 3% by weight of the final formulation, depending upon end use. While a large number of plasticizers may be used in formulations according to the present invention, preferred plasticizers include low molecular weight polyethyleneglycols (PEG, preferably ranging in weight from about 200 to 600 or more) and polyester adipate, among others.

Crosslinking agents or insolubilizers may also be added to the formulations of the present invention in amounts effective to decrease dispersibility of the formulations and produce agglomerates, depending upon the desired characteristics of the final articles. In the present invention, crosslinking agents are added in amounts generally ranging from about 0.01% to about 5%. Exemplary crosslinking agents include dimethylolurea and polyamide/epichlorohydrin, among others including urea polyamide/epichlorohydrin, among others including urea formaldehyde, melamine formaldehyde and other formaldehyde thermoset crosslinking agents, among others. One particularly advantageous application of the use of crosslinking agents is in creating bilayer or multilayer materials in which a first layer contains little or no crosslinking agent and is generally quite water dispersible and a second layer which contains effective amounts of a crosslinking agent to inhibit dispersibility and inhibit water dispersibility of that layer of the material. The layer containing the larger amounts of crosslinking agents may be advantageously employed to prevent bodily fluids from dispersing the water dispersible material too quickly or to support meat or related food products on packaging trays.

Formulations according to the present invention may also include effective amounts of a surfactant or water dispersal agent. The amount of surfactant utilized generally ranges from about 0.01% to about 2% by weight of the formulation, depending upon the degree of "wettability" desired. The addition of a surfactant generally enhances the dispersibility of the formulations according to the present invention.

Exemplary surfactants for use in the present invention include nonionic, cationic, anionic or amphoteric. Nonionic emulsifying compositions include, for example the lower alkylene oxide condensation products of hydrophobic compounds, for example ethylene oxide condensation products with higher fatty acids, higher fatty alcohols or alkylated aromatic hydrocarbons, higher molecular weight polypropylene glycols, amide and amine condensation products of which N-bis (2-hydroxyethyl)-lauramide is exemplary. Preferred nonionic surfactants include polyoxyethylene ethers including polyoxyethyleneisohexadecyl ether, polyoxyethylenelauryl ether, polyoxyethylenestearyl ether, and polyoxypropylenestearyl ether. Exemplary cationic surfactants for use in the present invention include, for example phenyl and alkyl ammonium surfactants, including benzalkonium bromide, benzethonium chloride, benzylhexadecyldimethylammonium chloride, and cetyltrimethylammonium bromide, among others, oxyethyl substituted ammonium surfactants, including oxyethylammonium phosphate, ethoxylated alkylamines and the alkylimidazolines. Many of these same agents may be added to compositions of the present invention for their antimicrobial characteristics. Exemplary anionic surfactants include sulfuric acid esters of polyhydric alcohols, e.g. lauryl sulfate, cetyl sulfate, etc., higher fatty alcohol sulfates derived from coconut oil, hydroxy sulfonated higher fatty acid esters such as, e.g., higher fatty acid esters of 2,3-dihydroxy-propane sulfonic acid, higher fatty acid esters of low molecular weight alkylol sulfonic acids, e.g., oleic acid ester of isethionic acid, sulfated higher fatty acid alkylolamides such as e.g., ethanolamide sulfates, higher fatty acid amides of amine alkyl sulfonic acids, e.g., lauric amide of taurine, among others, and aromatic containing anionic synthetic surfactants. Exemplary amphoteric surfactants include the salts of N-alkyl compounds of betaamino propionic acid wherein the alkyl group is derived from a fatty acid such as a mixture of coconut oil fatty acids, among others.

In addition to the above-described additives, the formulations according to the present invention may included fragrances, flavorings, pigments or other additives designed to enhance the cosmetic and/or organoleptic qualities of formulations according to the present invention. One of ordinary skill in the art will be able to readily modify the formulations within the keeping of the invention to provide final materials having ultimate utility for a large number of applications in a number of industries.

The following examples are provided for purposes of illustrating the present invention. These examples are presented only for illustration purposes and are not to be viewed as a limitation of the scope of the invention.

EXAMPLES

Materials and Methods

A) Material Processing

Standardized processing protocol was followed for all sample groups and consisted of the following:

1) Softwood pulp (Brunswick Prime Softwood, purchased from Georgia-Pacific Corp., Atlanta, Ga.) was hydrated and chopped in a food processor, and then the excess water was squeezed out. This process yielded long fibers with a residual water content of approximately 2.5 grams for every gram of pulp processed. These fibers were then separated in a mixer (Kitchen Aid Proline Model KSM5) for approximately 10 minutes until flaky.

2) All the dry ingredients including 22, 110 and 280 micron length fibers (SF300, SF900 and SF1016, available from Fiber Sales and Development Corporation under the tradename Solka-Floc), CMC (Food Grade 7LXF, from Aqualon, U.S.A.), HPM (Methocel F50, available from Dow Chemical, Inc.), HPC (Klucel Type GF, from Aqualon, U.S.A.) HEC (Cellosize QP 4400-H, from Union Carbide Corp., U.S.A.), sodium bicarbonate, citric acid were weighed out in grams and distributed throughout the long fibers in a mixer for another 10 minutes. All of the cellulose ethers used are food grade cellulose ethers.

3) The remaining free water was then added and the material was then beaten in a Kitchen Aid mixer for 15 minutes in order to thoroughly "wet out" the CMC binder, producing a dough of even consistency.

4) The dough from step 3) was then extruded through a grinding plate 6 times to separate any persistent long fiber agglomerates and to guarantee an intimate dispersion of components.

5) Experimental groups 4A-4D containing peroxide were processed as in steps 1)-4), and then a 3% solution of hydrogen peroxide was added and the dough mixed briefly.

6) The final dough was rolled out by hand to a uniform thickness of ⅛ inch (except where indicated), cut into 1.75 inch diameter disks, and dried in a convection oven at 110°-120° C. for 30 minutes. The disks were turned over every 10 minutes in order to allow even drying.

7) Experimental groups 2, 3 and 5 were dried for an additional 5 minutes in order to drive out excess residual water.

B) Dispersal Time Determination

All sample disks (10 disks per sample formulation) were immersed in 350 ml. of hot tap water (generally, ranging from 45°-49° C.) and continuously agitated on stir speed #4 (Corning Laboratory Hotplate/stirrer Model PC162) until they were completely dispersed. The experimental endpoint was defined when the dispersed material passed cleanly through a 15 mesh screen (15 openings per inch), leaving no agglomerates. Data presented is generally averaged for the 10 different samples unless otherwise indicated.

EXAMPLE 1

Effect of Changing Long and Short Fiber Concentration on Dispersal Times

The following sample formulations were made using the general procedure set forth above in the materials and methods section. Dispersal times were tested according to the above protocol to determine the effect that the varying concentrations of short and long fibers have on dispersal times. 10 samples of each of the five formulations were dispersed in water. Times, temperatures, weights, thicknesses, etc. were averaged for the 10 samples for each formulation.

TABLE 1

| | Formulations for Example 1 | | | | |
|---|---|---|---|---|---|
| Sample # | 1 | 2 | 3 | 4 | 5 |
| Short Fibers (Grams) | | | | | |
| SF 300 (22 Microns) | 0 | 0 | 0 | 5 | 6.67 |
| SF 900 (110 Micr.) | 0 | 0 | 6.25 | 5 | 6.67 |
| SF 1016 (280 Mic.) | 0 | 8.33 | 6.25 | 5 | 6.67 |
| SF % of Total Fibers | 0.00 | 33.33 | 50.00 | 60.00 | 80.00 |
| Long Fibers (Grams) Softwood Pulp | 25 | 16.67 | 12.5 | 10 | 5 |
| LF % of Total Fibers | 100.00 | 66.67 | 50.00 | 40.00 | 20.00 |
| CMC (7LXF) | 4 | 4 | 4 | 4 | 4 |
| TOTAL WATER | 87.5 | 65.5 | 65 | 65 | 65 |

TABLE 2

| DISPERSAL TIMES FOR EXAMPLE 2 FORMULATIONS | | | | | |
|---|---|---|---|---|---|
| Formulation | 1 | 2 | 3 | 4 | 5 |
| Water Temp. (°C.) | 46–47 | 46–49 | 45–48 | 45–47 | 46–49 |
| Volume (ml) | 350 | 350 | 350 | 350 | 350 |
| Agitation Speed | 4 | 4 | 4 | 4 | 4 |
| Weight (g., Avg.) | 1.68 | 2.54 | 2.18 | 2.18 | 2.301 |
| Thickness (in.) | 0.087 | 0.101 | 0.096 | 0.061 | 0.102 |
| Time (min.) | 13.7 | 13.95 | 30.2 | 49* | 50.7 |

*Denotes corrected dispersal time based on thickness differential with other samples.

Conclusion—The results of the experiment of Example 1 as set forth in Table 2, above, evidence that dispersal time increases as the amount of long fiber is decreased and the amount of short fiber increases (See FIG. 1). The shortest dispersal time measured was for a long fiber concentration of 100%, and the longest time was for the lowest long fiber concentration. This affect may be the result of the long fibers absorbing water into the material by a "wicking" phenomenon, thereby making the water available for the solubilization of the binder. Another contributing factor may be the reduction of free volume (voids) within the material as the fiber length is reduced, thereby providing less interstitial space for the water to occupy and consequently, increasing dispersal time.

EXAMPLE 2

Dispersal Times for Varying Thicknesses of Formula 4 from Example 1

Formula 4 from Example 1 was formed into disks having varying thicknesses and the same disk size (1.75 in. diameter). Five samples of Formula 4 at each of 3 thicknesses were water dispersed and measured for dispersal times. The results are presented below in Table 3. For each of the three samples (5 disks for each sample), thickness, water temperature, volume, agitation speed, weight and time, the results have been averaged.

TABLE 3

| Dispersal Times of Formula 4 at Varying Thicknesses | | | |
|---|---|---|---|
| Sample (5 for Each) | 1 | 2 | 3 |
| Thickness (in.) | 0.0618 | 0.089 | 0.1316 |
| Water Temp. (°C.) | 45–47 | 45–49 | 45–47 |
| Volume (ml) | 350 | 350 | 350 |
| Agitation Speed | 4 | 4 | 4 |
| Weight (g., Avg.) | 1.312 | 2.246 | 3.618 |
| Time (min.) | 21.7 | 44.2 | 73.4 |

Figure 2:
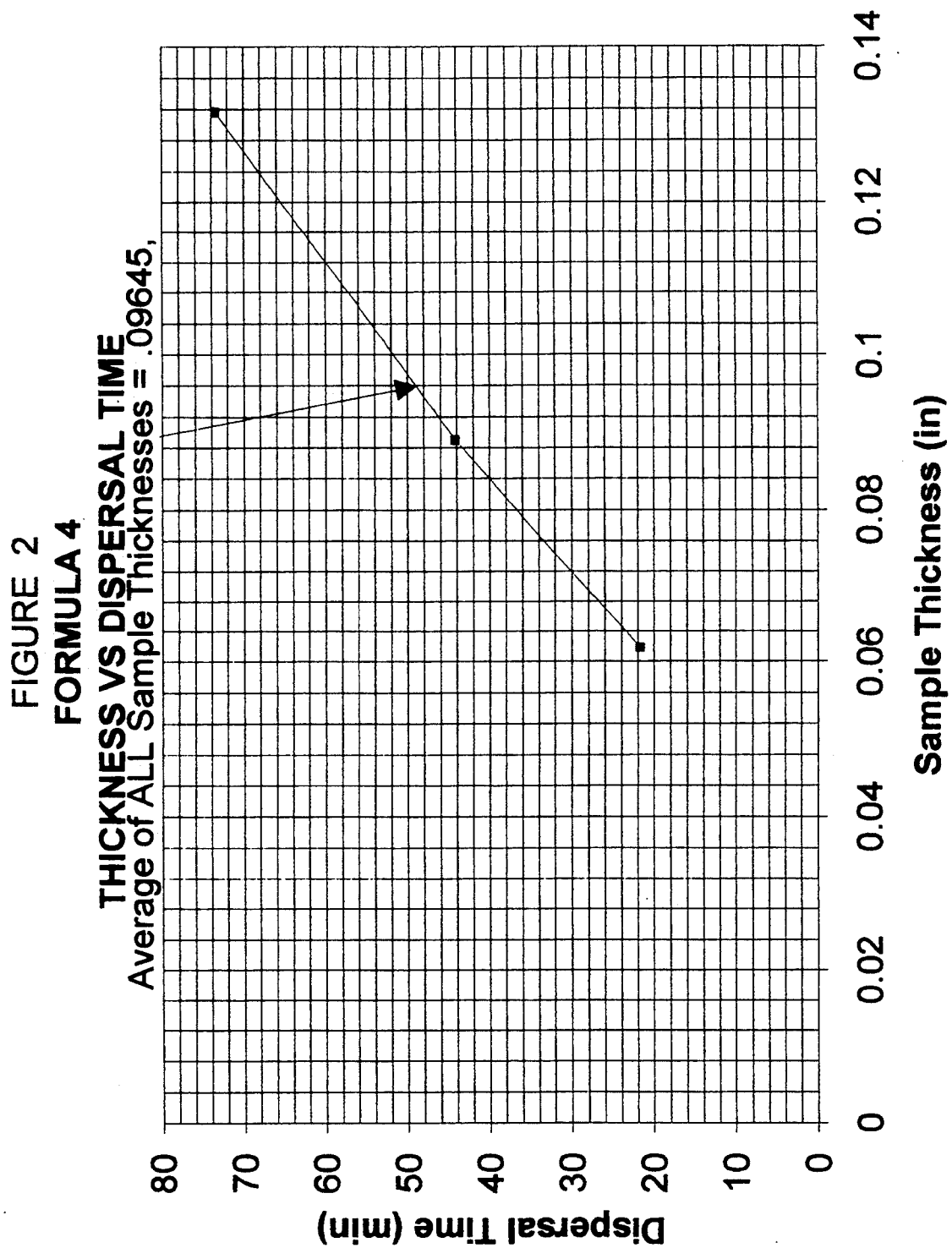

The results obtained clearly evidence that for a given material, dispersal time is directly proportional to the thickness of the material (see FIG. 2).

EXAMPLE 3

Formulations Containing Peroxide or Sodium Bicarbonate/Citric Acid as Gas Releasing Agents-Effect on Dispersal Time Seven different formulations derived from Formulation 4 of Example 1 were made and tested for dispersal times. In particular, certain gas releasing agents were added to the CMC filler in order to determine the effect on dispersal time. Those seven sample formulations are listed separately on Table 4. The amount of each component added, except for the peroxide solution, is set forth in grams. The amount of peroxide solution added is set forth as ml. Grams of peroxide are simply determined from the density of the 3% peroxide solution which is 1.4 g/ml.

Each of ten samples for Formulations 4 and 4A–H were measured for dispersal times. The results are presented below in Table 5. For each of the formulations (10 disks for each sample), water temperature, volume, agitation speed, weight, thickness and time, the results have been averaged.

Figure 3:
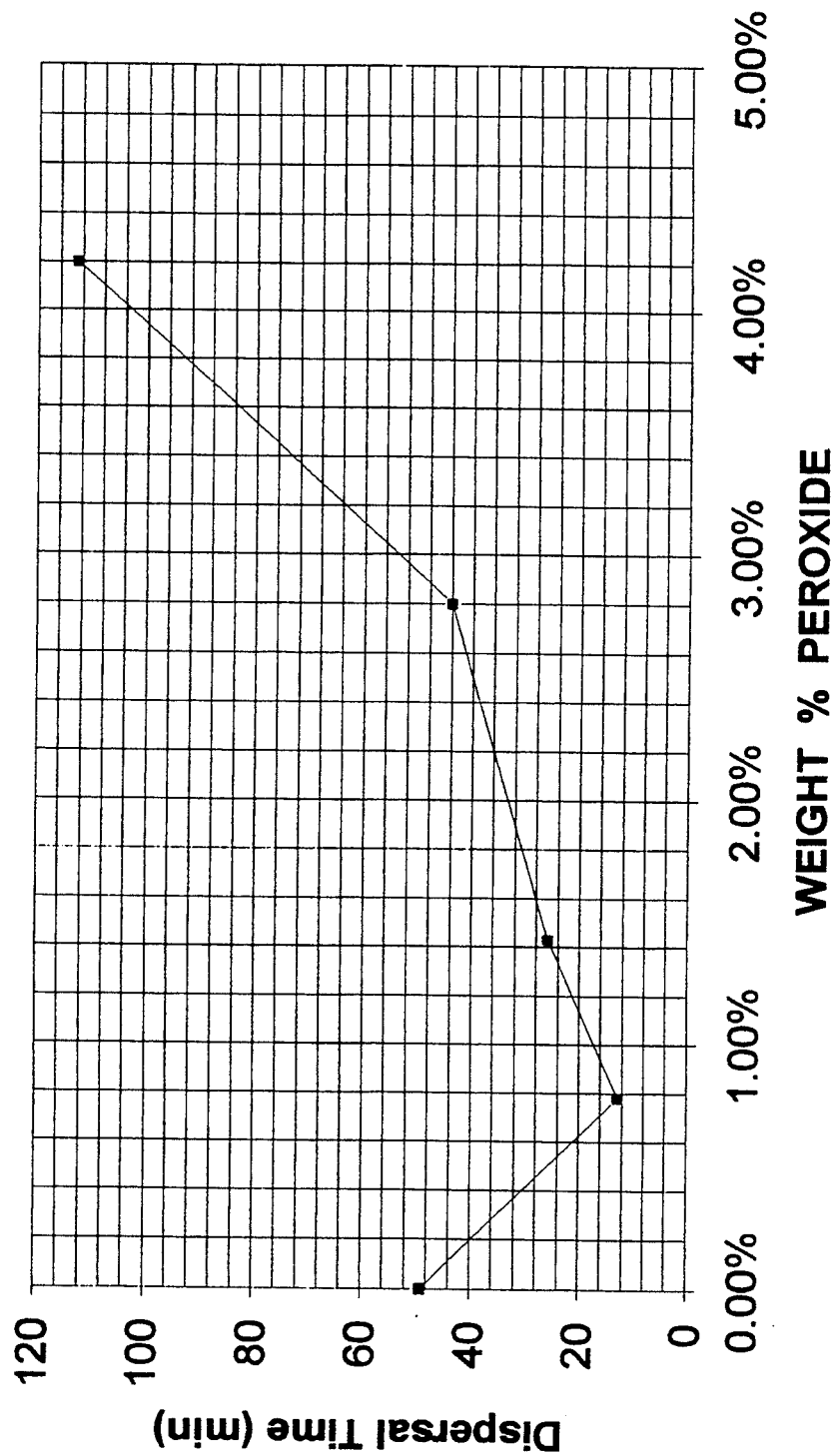

The results set forth in Table 5 clearly evidence that the inclusion of low concentrations of hydrogen peroxide increases water dispersibility. FIG. 3 shows that the dispersal time is directly dependent on the peroxide content. The addition of peroxide at concentrations of 2.9% by weight and below decreased the dispersal time of the material, as compared to the unmodified formula. This data would suggest that the inclusion of hydrogen peroxide in cellulose ether binders other than carboxymethylcellulose (CMC) and carboxymethylhydroxyethylcellulose (CMHEC) should decrease the dispersal time dramatically, while in the case of CMC and CMHEC binders, the dispersal time would decrease at low concentrations of hydrogen peroxide and unexpectedly increased after the amount of hdyrogen peroxide reached about 20% by weight of the binder. It would be expected that as the molecular weight of the peroxide gas releasing agent increased (from hydrogen to benzylperoxide, etc.), the weight percentage of peroxide required to begin to inhibit dispersibility would also increase above 20% by weight.

Figure 4:
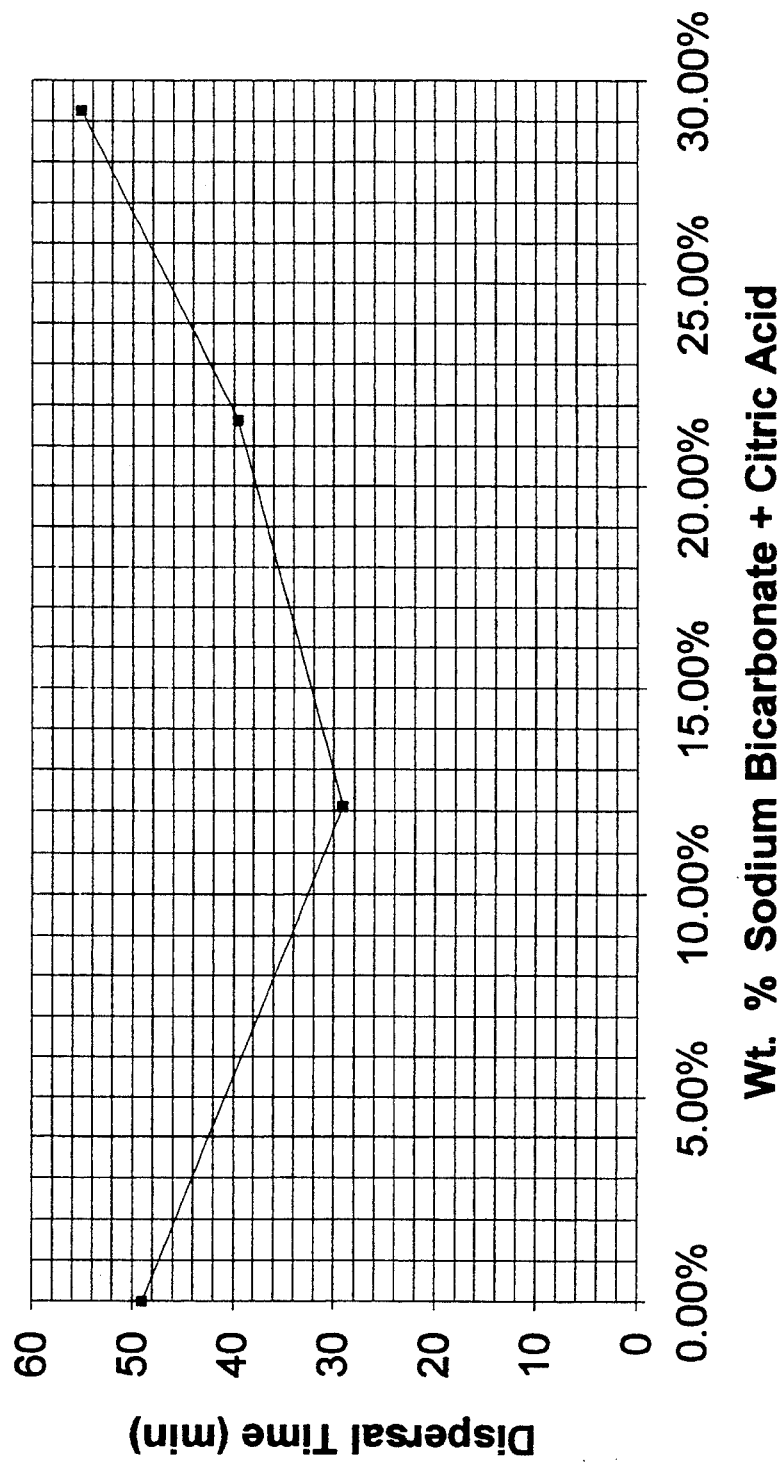
Figure 5:
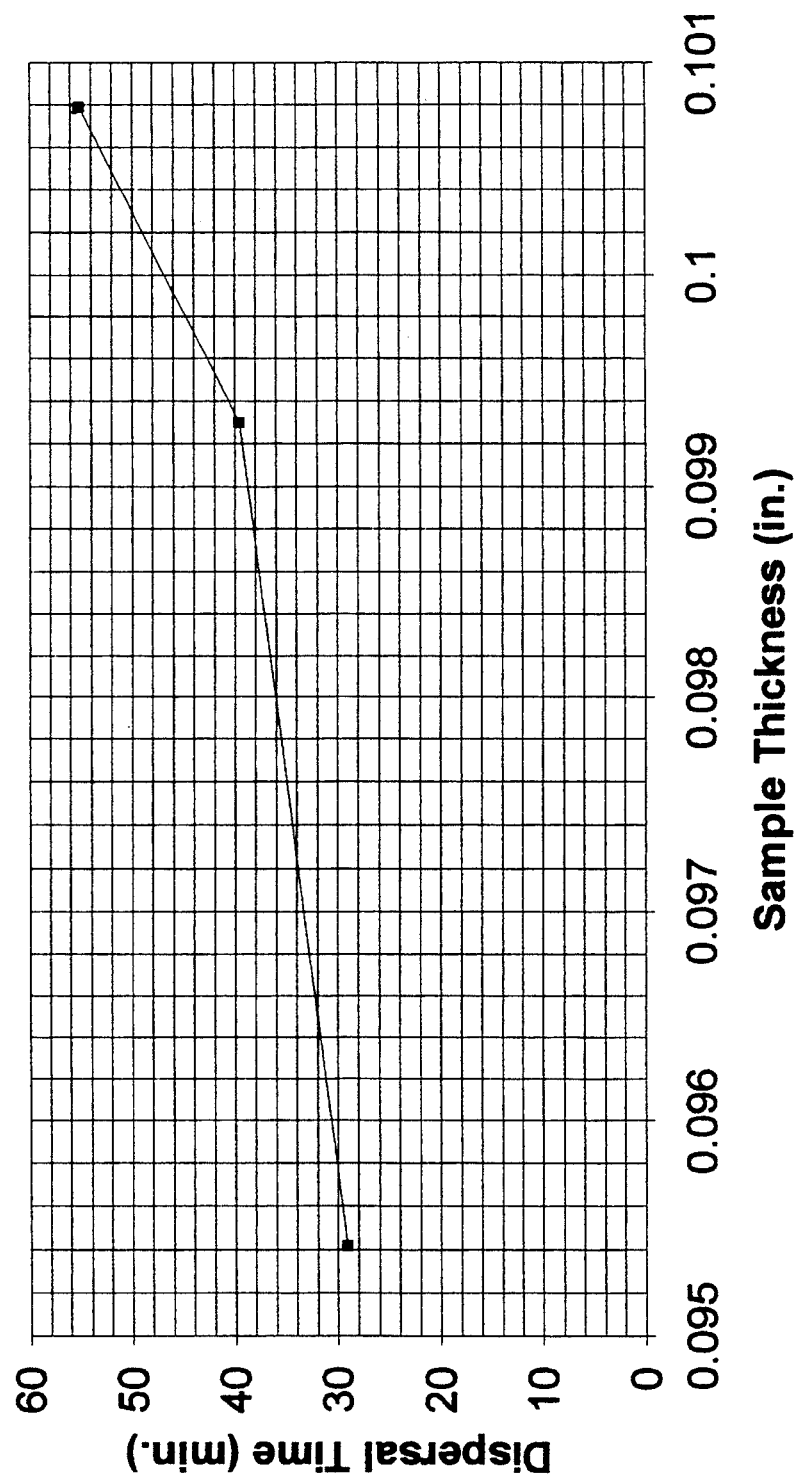
Figure 6:
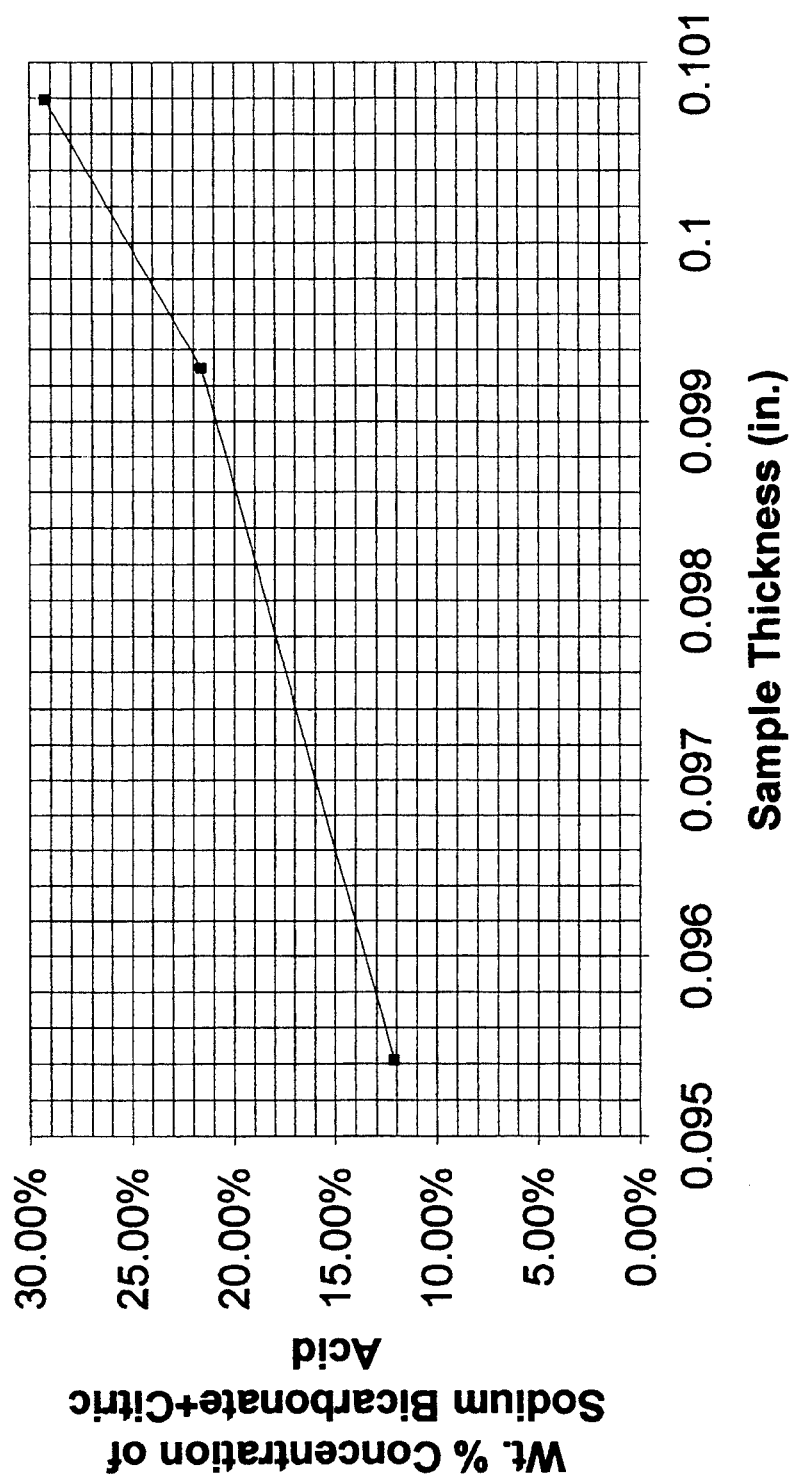

In the case of sodium bicarbonate/citric acid, it appears that this combination tends to enhance dispersal of the material at lower concentrations, but this effect disappears at concentrations greater than about 30% by weight of the formulation. It is believed that as the amount of gas releasing agent approaches 30% of the dry weight of the formulation, the physical characteristics of the material become increasingly ceramic-like, which appears to prevent the water entering the binder matrix. FIGS. 4 and 5 clearly evidence that dispersal time has a direct dependence on both concentration of gas releasing agent and sample thickness, while FIG. 6 illustrates that the sample thickness is directly proportional to the concentration of the additives.

Figure 7:
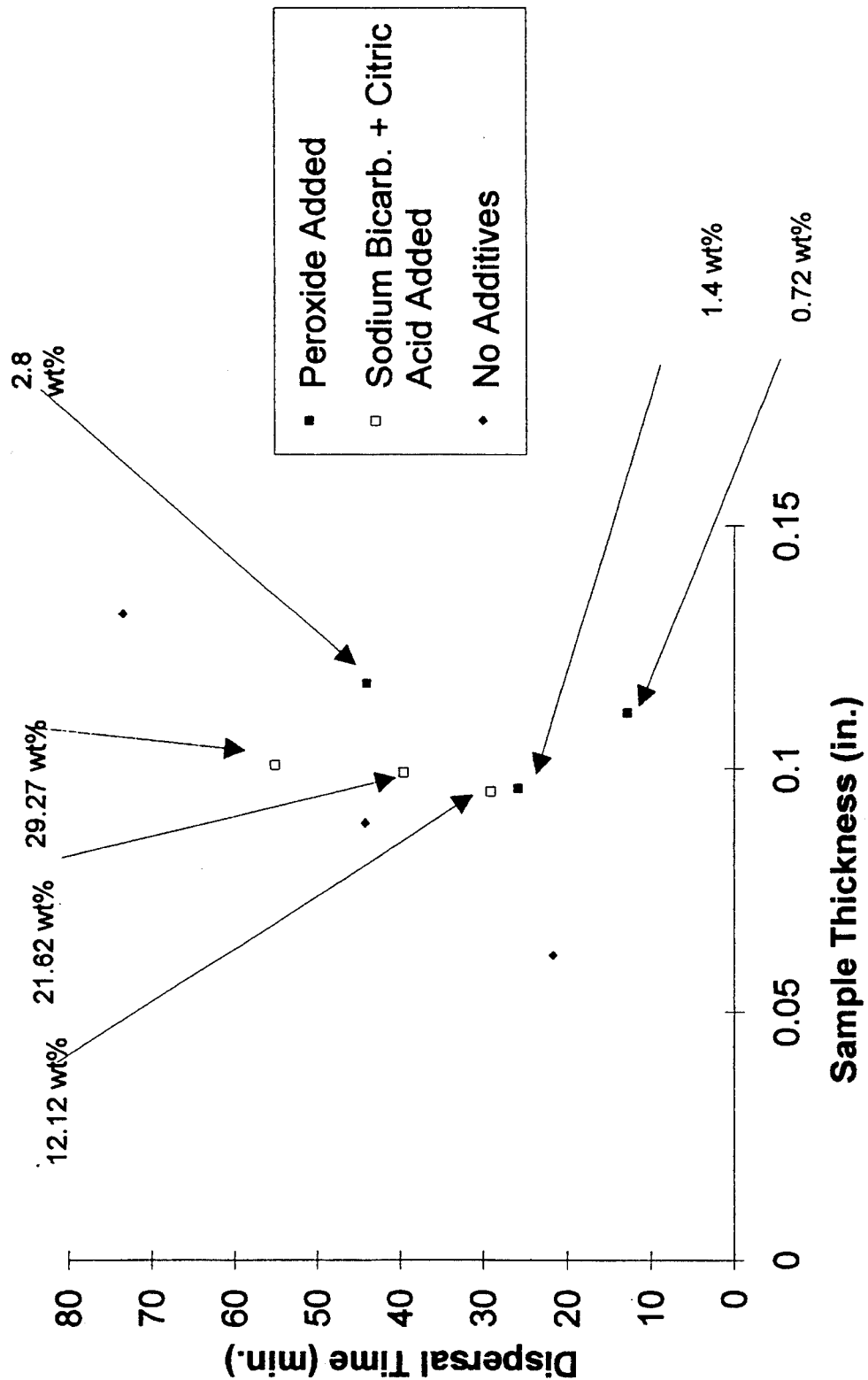

FIG. 7 summarizes the comparison of dispersal times of materials containing varying amounts of gas releasing agents. The figure evidences that the inclusion of gas releasing agents in effective amounts will increase the water dispersibility of compositions according to the present invention.

TABLE 4

| Additive Formulations Containing Hydrogen Peroxide and Sodium Bicarbonate As Releasing Agents | | | | | | | | |
|---|---|---|---|---|---|---|---|---|
| Formulation No. | 4 | A | B | C | D | E | F | G |
| Short Fibers (Grams) | | | | | | | | |
| SF 300 (22 Microns) | 5 | 5 | 5 | 5 | 5 | 5 | 5 | 5 |
| SF 900 (110 Micr.) | 5 | 5 | 5 | 5 | 5 | 5 | 5 | 5 |
| SF 1016 (286 Mic.) | 5 | 5 | 5 | 5 | 5 | 5 | 5 | 5 |

TABLE 4-continued

Additive Formulations Containing Hydrogen Peroxide and Sodium Bicarbonate As Releasing Agents

| Formulation No. | 4 | A | B | C | D | E | F | G |
|---|---|---|---|---|---|---|---|---|
| SF % of Total Fibers | 60 | 60 | 60 | 60 | 60 | 60 | 60 | 60 |
| Long Fibers (Grams) | | | | | | | | |
| Softwood Pulp | 10 | 10 | 10 | 10 | 10 | 10 | 10 | 10 |
| LF % of Total Fibers | 40 | 40 | 40 | 40 | 40 | 40 | 40 | 40 |
| CMC (7LXF) | 4 | 4 | 4 | 4 | 4 | 4 | 4 | 4 |
| Peroxide (3% Solution) | | 5 | 10 | 20 | 30 | | | |
| Sodium Bicarbonate | | | | | | 2 | 4 | 6 |
| Citric Acid (dry) | | | | | | 2 | 4 | 6 |
| Gas Releasing Agent as Wt. % of Dry Components | 0 | 0.72% | 1.4 | 2.8 | 4.2 | 12.12 | 21.62 | 29.27% |
| TOTAL WATER | 65 | 60 | 55 | 45 | 35 | 65 | 65 | 65 |

TABLE 5

Dispersal Times For Additive Formulations 4 A–G

| Formulation | 4 | 4A | 4B | 4C | 4D | 4E | 4F | 4G |
|---|---|---|---|---|---|---|---|---|
| Water Temp. (°C.) | 45–47 | 47–48 | 46–48 | 46–50 | 45–48 | 46–48 | 45–48 | 45–48 |
| Volume (ml) | 350 | 350 | 350 | 350 | 350 | 350 | 350 | 350 |
| Agitation Speed | 4 | 4 | 4 | 4 | 4 | 4 | 4 | 4 |
| Weight (g., Avg.) | 2.18 | 2.143 | 2.188 | 2.585 | 2.284 | 2.187 | 2.485 | 3.22 |
| Thickness (in.) | 0.061 | 0.111 | 0.096 | 0.117 | 0.097 | 0.095 | 0.099 | 0.100 |
| Time (min.) | 49* | 12.8 | 25.9 | 44 | 112.9 | 29.1 | 39.6 | 55.1 |

*Dispersal Time adjusted for thickness effect.

EXAMPLE 4

Unmodified Formulations Using Different Binders

The following formulations were made using the general methods set forth in the materials and methods section, above. In samples 9–11 (see Table 6, below), the CMC binder of sample formulation 8 was replaced with hydroxypropylmethylcellulose (HPM, Methocel F 50 from Dow Chemical Co.), hydroxypropylcellulose (HPC, Klucel Tpe GF from Aqualon) and hydroxyethylcellulose (HEC, Cellosize QP 4400-H from Union Carbide Co.). The samples set forth in Table 6 were subsequently used in experiments to determine the effects of changing the binder on water dispersibility.

TABLE 6

Unmodified Formulations with Different Binders

| Sample # | 8 | 9 | 10 | 11 |
|---|---|---|---|---|
| Short Fibers (Grams) | | | | |
| SF 900 (110 Micr.) | 7.5 | 7.5 | 7.5 | 7.5 |
| SF 1016 (280 Mic.) | 7.5 | 7.5 | 7.5 | 7.5 |
| SF % of Total Fibers | 60.00 | 60.00 | 60.00 | 60.00 |
| Long Fibers (Grams) Softwood Pulp | 10 | 10 | 10 | 10 |
| LF % of Total Fibers | 40.00 | 40.00 | 40.00 | 40.00 |
| Binder | 4 CMC | 4 HPM | 4 HPC | 2 HEC* |
| TOTAL WATER | 65 | 65 | 65 | 65 |

*HEC is used in half the amount as the other binders because of viscosity limitations during processing.

EXAMPLE 5

CMC Binder Formula Modifications

Sample formulation #8 from Example 4, above, was modified to change the concentration of CMC binder to determine the effect that increased binder has on water dispersibility. Sample 8 from Example 4, was compared with two formulations which were identical to sample 8 except that the amount of CMC binder was either decreased or increased relative to sample 8. The sample formulations were made pursuant to the previously described general method and dispersal times for each of the three formulations were determined as above.

TABLE 7

Formulations With Varying CMC Binder Content

| Sample # | 8 | 8A | 8G |
|---|---|---|---|
| Short Fibers (Grams) | | | |
| SF 900 (110 Micr.) | 7.5 | 7.5 | 7.5 |
| SF 1016 (280 Mic.) | 7.5 | 7.5 | 7.5 |
| SF % of Total Fibers | 60.00 | 60.00 | 60.00 |
| Long Fibers (Grams) Softwood Pulp | 10 | 10 | 10 |
| LF % of Total Fibers | 40.00 | 40.00 | 40.00 |
| CMC Binder | 4 | 2 | 11 |
| % Binder of Solids | 13.79% | 7.40 | 30.55 |
| TOTAL WATER | 65 | 65 | 65 |

Figure 8:
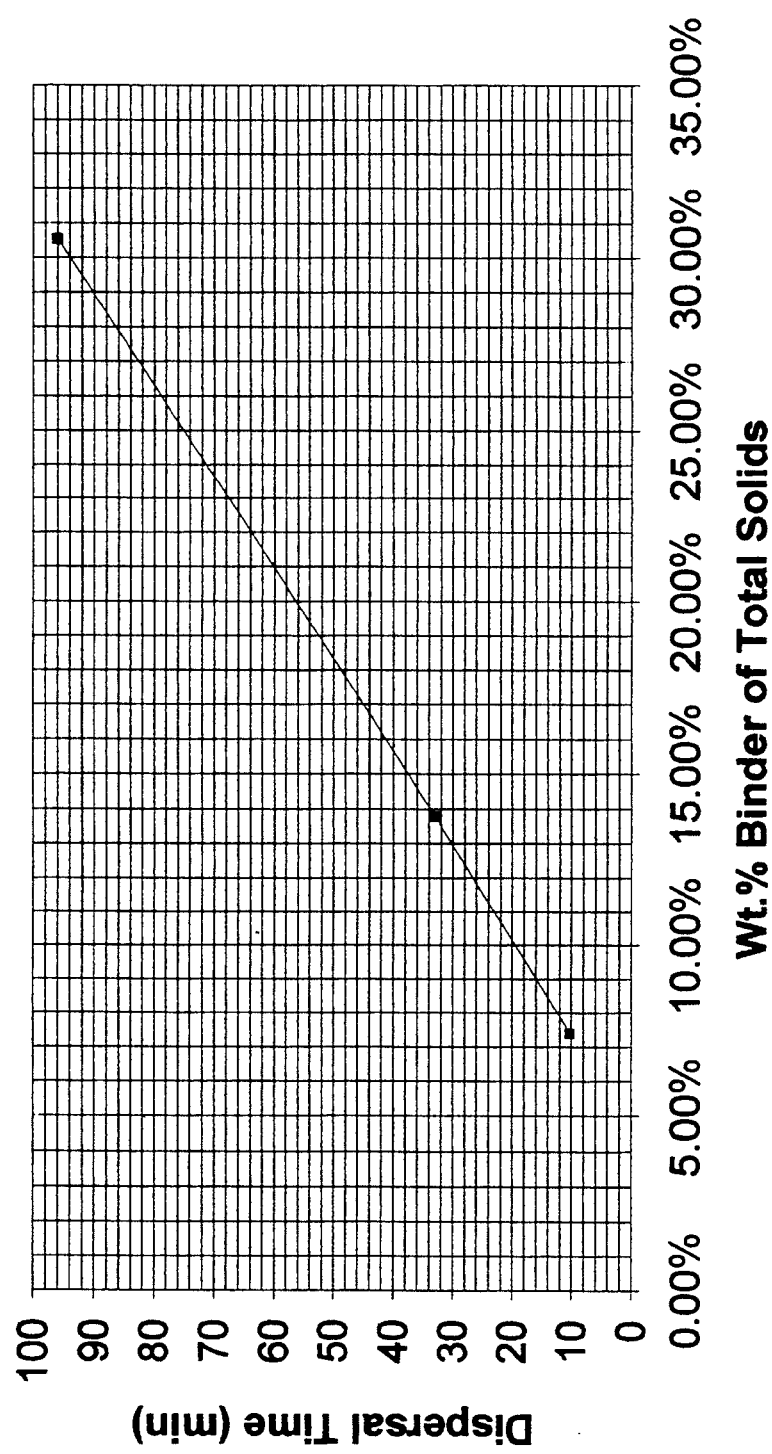

The above three formulations were then dispersed in water using the general method set forth above. The results of the dispersal times as a function of CMC binder concentration appear in FIG. 8. FIG. 8 evidences that as the concentration of binder increases in a given formulation, water dispersibility decreases.

EXAMPLE 6

Effect of Gas Releasing Agents on Dispersal Time at Low CMC Concentration

Sample formulation 8A from example 5 was modified using the general methods described above to produce 5 different formulations having varying concentrations of peroxide or sodium bicarbonate/citric acid as set forth in Table 8, below. These sample formulations were then tested using the general methodology to determine water dispersbility.

TABLE 8

Low Concentration CMC Formulations

| Sample # | 8A | 8B | 8C | 8D | 8E | 8F |
|---|---|---|---|---|---|---|
| Short Fibers (Grams) | | | | | | |
| SF 900 (110 Micr.) | 7.5 | 7.5 | 7.5 | 7.5 | 7.5 | 7.5 |
| SF 1016 (280 Mic.) | 7.5 | 7.5 | 7.5 | 7.5 | 7.5 | 7.5 |
| SF % of Total Fibers | 60 | 60 | 60 | 60 | 60 | 60 |
| Long Fibers (Grams) Softwood Pulp | 10 | 10 | 10 | 10 | 10 | 10 |
| LF % of Total Fibers | 40 | 40 | 40 | 40 | 40 | 40 |
| CMC Binder | 2 | 2 | 2 | 2 | 2 | 2 |

TABLE 8-continued

| Low Concentration CMC Formulations | | | | | | |
|---|---|---|---|---|---|---|
| Sample # | 8A | 8B | 8C | 8D | 8E | 8F |
| % Binder of Solids | 7.4 | 7.39 | 7.37 | 7.26 | 3.37 | 3.01 |
| Peroxide (3%) | | 2 | 4 | 18 | | |
| Sodium Bicarbonate | | | | | 2.35 | 3.6 |
| Citric Acid | | | | | 2.35 | 3.6 |
| Modifier % of Dry Wt. | | 0.31 | 0.62 | 2.7 | 14.83 | 21.05 |
| TOTAL WATER | 65 | 63 | 61 | 47 | 65 | 65 |

The above six formulations were then dispersed in water using the general method set forth above (Table 9, below).

TABLE 9

| Dispersal Times of Low CHC Formulations | | | | | | |
|---|---|---|---|---|---|---|
| Sample # | 8A | 8B | 8C | 8D | 8E | 8F |
| Thickness | 0.119 | 0.114 | 0.119 | 0.119 | 0.109 | 0.122 |
| Water Temp. | 47–49 | 45–50 | 47–48 | 44–48 | 46–49 | 47–48 |
| Volume (ml) | 350 | 350 | 350 | 350 | 350 | 350 |
| Agitation Speed | 4 | 4 | 4 | 4 | 4 | 4 |
| Weight (g. Avg) | 2.71 | 2.51 | 2.61 | 2.67 | 1.77 | 2.72 |
| Time (min.) | 10.3 | 5.9 | 30.1 | 85.2 | 8.6 | 25.7 |

Figure 11:
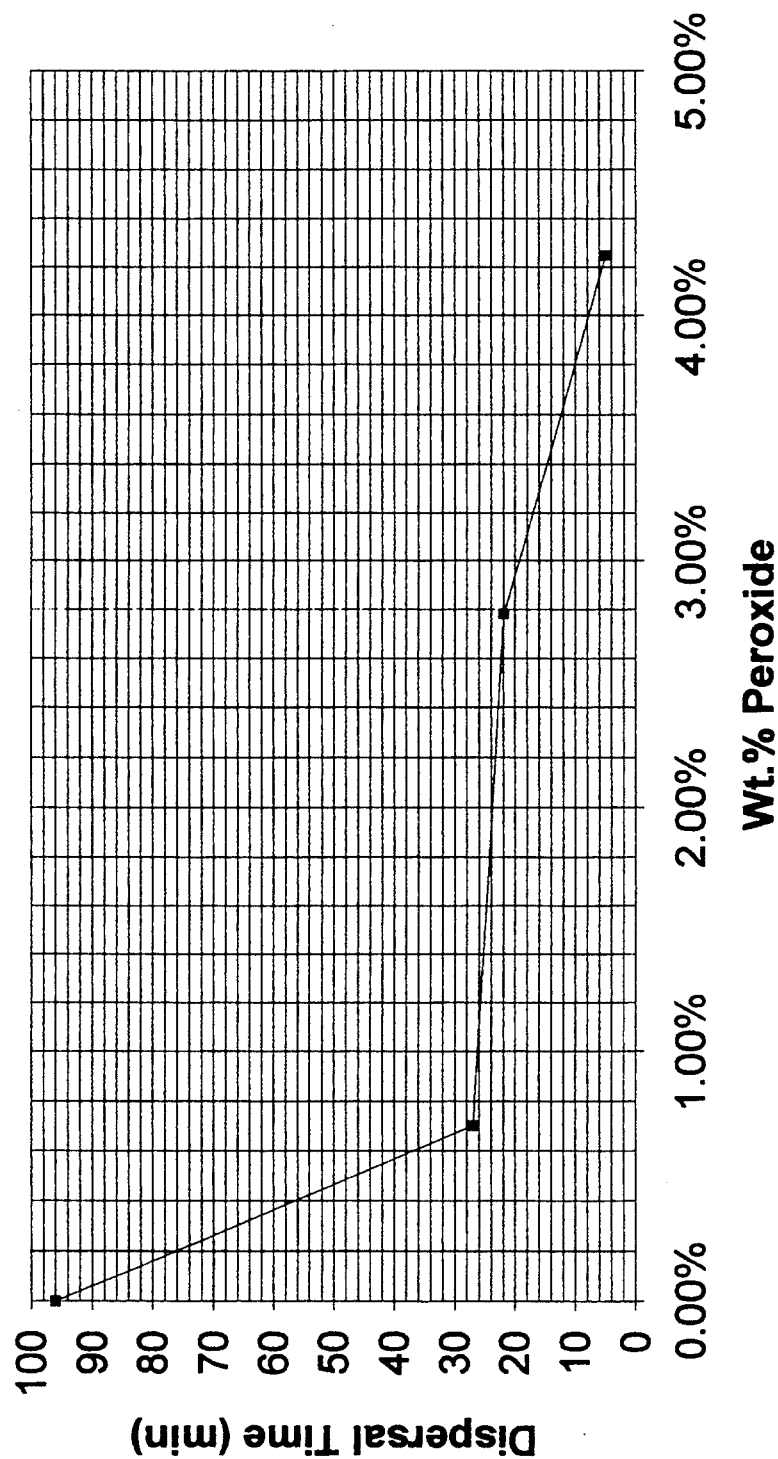

The results of the dispersal times for formulations 8A–D (See FIG. 9) evidence that at low concentration of peroxide using CMC as a binder, there is a definite increase in water dispersibility. However, as the concentration of peroxide increases relative to the CMC binder, the water dispersibility of the CMC containing formulations actually decreases, an anomaly perhaps best explained by complexation of the peroxide with the carboxymethylcellulose to produce water insoluble cellulose intermediates. This same trend holds for high CMC concentrations (See Example 7, below and FIG. 11, also below).

Figure 10:
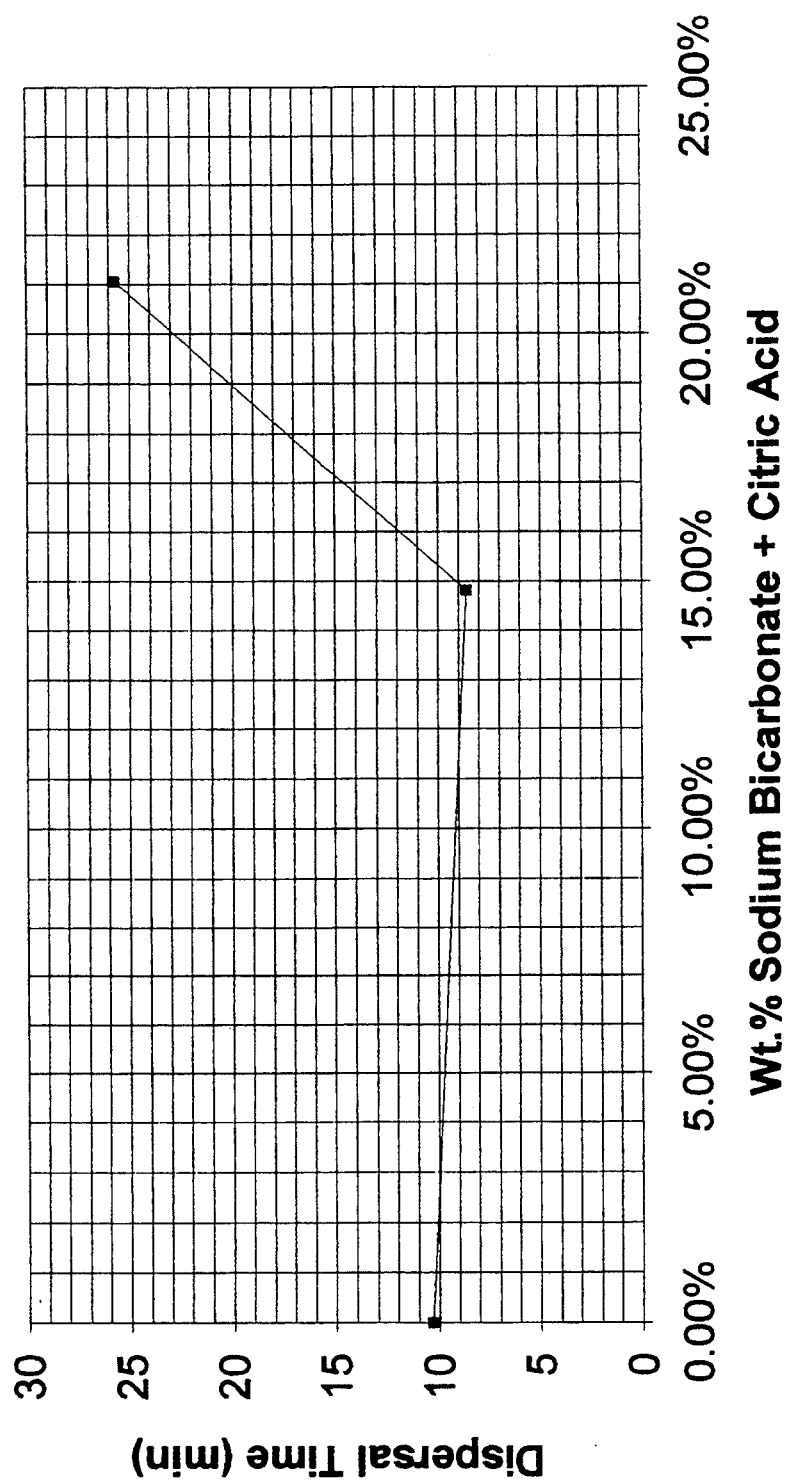
Figure 12:
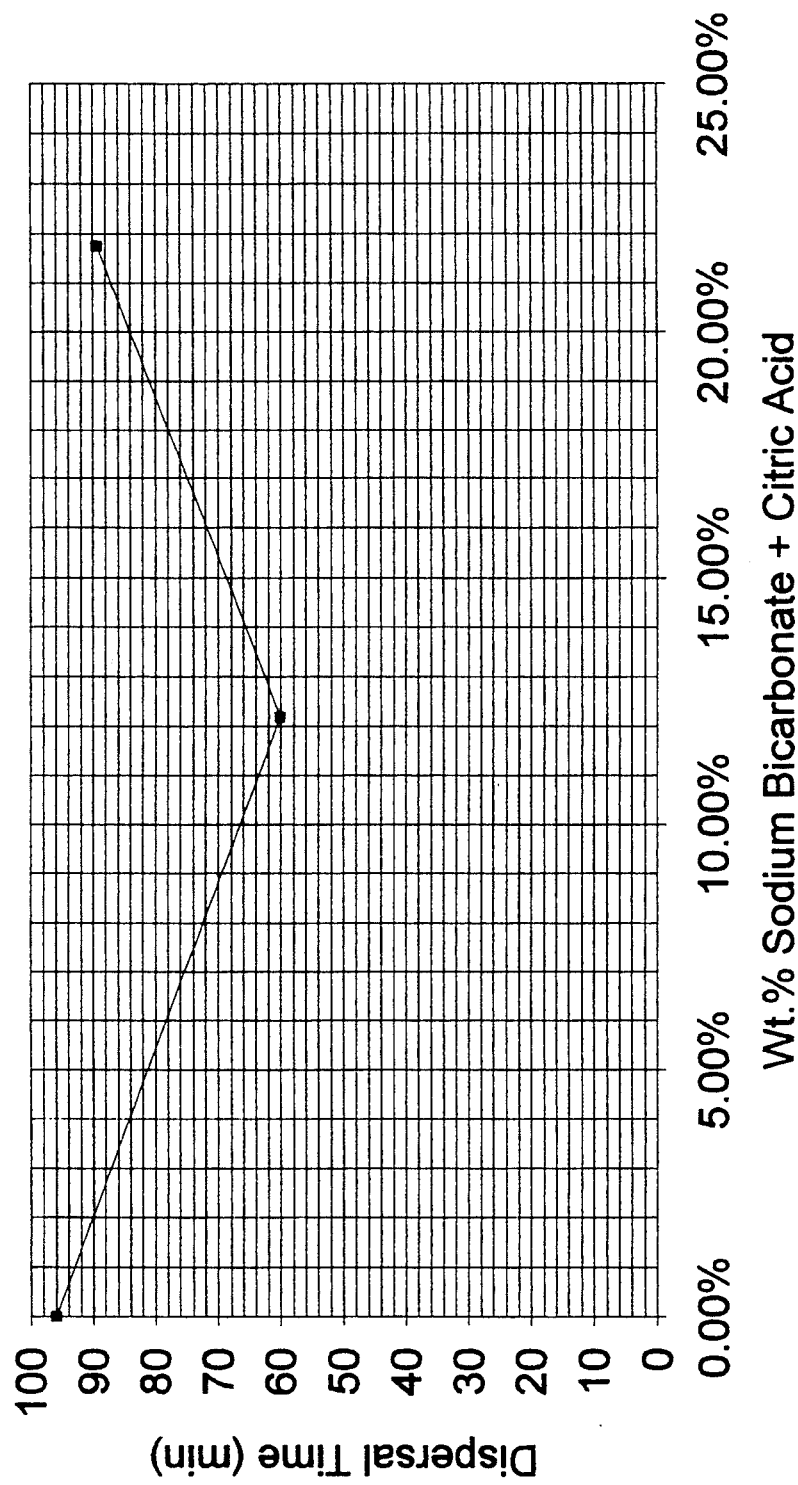

The results of the dispersal times for formulations 8A and 8E–F (See FIG. 10) evidence that the inclusion of a combination of sodium bicarbonate and citric acid will increase water dispersibility (the effect is much more marked at higher CMC concentrations, see Example 7, below and FIG. 12). At low CMC concentration, the bicarbonate/citric acid combination increases water dispersibility at concentrations less than about 15% by weight. When the concentration of the bicarbonate/acid increases to 20% or more by weight for these same formulations, water dispersibility actually decreases. As the concentration of CMC (or other water soluble cellulose ether) increases, the decrease in water dispersibility occurs when the bicarbonate/citric acid is at a higher percentage (about 30% by weight). This appears to be due to the ceramic-like character imparted to the materials by the high levels of bicarbonate/citric acid.

EXAMPLE 7

Effect of Gas Releasing Agents on Dispersal Time at High CMC Concentration

Sample formulation 8 was modified to contain high concentration of CMC (Sample 8G). Sample 8G was used to produce 5 samples (8H–8L) having varying concentrations of peroxide or sodium bicarbonate/citric acid as set forth in Table 10, below. These sample formulations were then tested using the general methodology to determine water dispersbility.

TABLE 10

| High Concentration CMC Formulations | | | | | | |
|---|---|---|---|---|---|---|
| Sample # | 8G | 8H | 8I | 8J | 8K | 8L |
| Short Fibers (Grams) | | | | | | |
| SF 900 (110 Micr.) | 7.5 | 7.5 | 7.5 | 7.5 | 7.5 | 7.5 |
| SF 1016 (280 Mic.) | 7.5 | 7.5 | 7.5 | 7.5 | 7.5 | 7.5 |
| SF % of Total Fibers | 60 | 60 | 60 | 60 | 60 | 60 |
| Long Fibers (Grams) Softwood Pulp | 10 | 10 | 10 | 10 | 10 | 10 |
| LF % of Total Fibers | 40 | 40 | 40 | 40 | 40 | 40 |
| CMC Binder | 11 | 11 | 11 | 11 | 11 | 11 |
| % Binder of Solids | 30.55 | 30.40 | 29.94 | 29.62 | 26.83 | 23.91 |
| Peroxide (3%) | | 6 | 24.5 | 38 | | |
| Sodium Bicarbonate | | | | | 2.5 | 5 |
| Citric Acid | | | | | 2.5 | 5 |
| Modifier % of Dry Wt. | | 0.7 | 2.78 | 4.25 | 12.19 | 21.74 |
| TOTAL WATER | 65 | 59 | 40.5 | 27 | 65 | 65 |

The above six formulations were then dispersed in water using the general method set forth above (See Table 11).

TABLE 11

| Dispersal Times of High CMC Formulations | | | | | | |
|---|---|---|---|---|---|---|
| Sample # | 8G | 8H | 8I | 8J | 8K | 8L |
| Thickness | 0.105 | 0.113 | 0.144 | 0.119 | 0.106 | 0.128 |
| Water Temp. | 45–49 | 45–48 | 46–48 | 46–49 | 45–50 | 47–49 |
| Volume (ml) | 350 | 350 | 350 | 350 | 350 | 350 |
| Agitation Speed | 4 | 4 | 4 | 4 | 4 | 4 |
| Weight (g. Avg) | 3.15 | 2.73 | 3.14 | 2.99 | 2.96 | 4.26 |
| Time (min.) | 96 | 27 | 21.9 | 4.95 | 60.1 | 89.4 |

Figure 9:
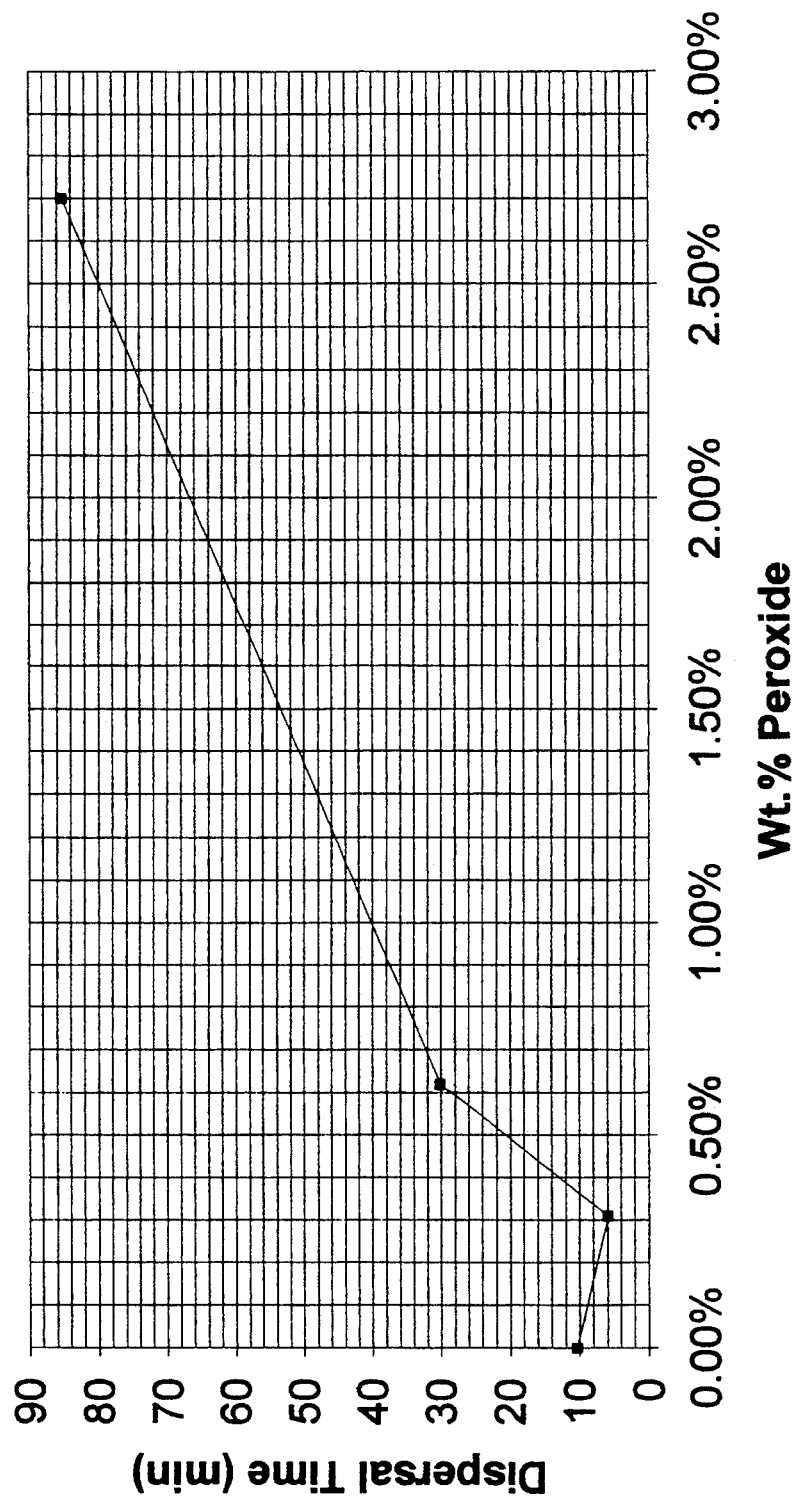

The results of the dispersal times for formulations 8G–J (See FIG. 11) parallel the results for low CMC concentration (FIG. 9). These studies evidence that the amount of peroxide which can be added to increase water dispersibility increases as the the concentration of binder increases. Beyond a certain amount of peroxide/binder concentration, the tendency of the peroxide to increase water dispersibility is reduced and is replaced by the peroxide's tendency to decrease dispersibility because of complexation (with carboxymethylcellulose and carboxymethylhydroxyethylcellulose).

The results of the dispersal times for formulations 8G and 8K–L (See FIG. 12) evidence that the inclusion of a combination of sodium bicarbonate and citric acid will increase water dispersibility up to a point (about 20–30% by weight).

EXAMPLE 8

Effect of Gas Releasing Agents on Dispersal Time of HPM Containing Formulation

Sample formulation 9 was modified to contain hydroxypropylmethylcellulose. Sample 9 was used to produce 4 samples (9A–9D) having varying concentrations of peroxide or sodium bicarbonate/citric acid as set forth in Table 10, below. These sample formulations were then tested using the general methodology to determine water dispersbility.

TABLE 12

| HPM Formulations-Effects of Gas Releasing Agents | | | | | |
|---|---|---|---|---|---|
| Sample # | 9 | 9A | 9B | 9C | 9D |
| Short Fibers (Grams) | | | | | |
| SF 900 (110 Micr.) | 7.5 | 7.5 | 7.5 | 7.5 | 7.5 |
| SF 1016 (280 Mic.) | 7.5 | 7.5 | 7.5 | 7.5 | 7.5 |
| SF % of Total Fibers | 60 | 60 | 60 | 60 | 60 |
| Long Fibers (Grams) | 10 | 10 | 10 | 10 | 10 |

TABLE 12-continued

| HPM Formulations-Effects of Gas Releasing Agents | | | | | |
|---|---|---|---|---|---|
| Sample # | 9 | 9A | 9B | 9C | 9D |
| Softwood Pulp | | | | | |
| LF % of Total Fibers | 40 | 40 | 40 | 40 | 40 |
| HPM Binder | 4 | 4 | 4 | 4 | 4 |
| % Binder of Solids | 13.79% | 13.72 | 13.5 | 12.1 | 10.8 |
| Peroxide (3%) | | 5 | 20 | | |
| Sodium Bicarbonate | | | | 2 | 4 |
| Citric Acid | | | | 2 | 4 |
| Modifier % of Dry Wt. | | 0.72 | 2.8 | 12.12 | 21.62 |
| TOTAL WATER | 65 | 60 | 45 | 65 | 65 |

After formulation, the above five sample formulations were then dispersed in water using the general method set forth above (10 times for each formulation, See Table 13, below).

TABLE 13

| Dispersal Times of HPM Formulations | | | | | |
|---|---|---|---|---|---|
| Sample # | 9 | 9A | 9B | 9C | 9D |
| Thickness | 0.106 | 0.11 | 0.116 | 0.12 | 0.126 |
| Water Temp. | 45–48 | 46–48 | 45–48 | 47–49 | 47–48 |
| Volume (ml) | 350 | 350 | 350 | 350 | 350 |
| Agitation Speed | 4 | 4 | 4 | 4 | 4 |
| Weight (g. Avg) | 2.17 | 1.95 | 1.77 | 2.22 | 2.58 |
| Time (min.) | 262.4 | 25.4 | 37.8 | 32.5 | 68.8 |

Figure 13:
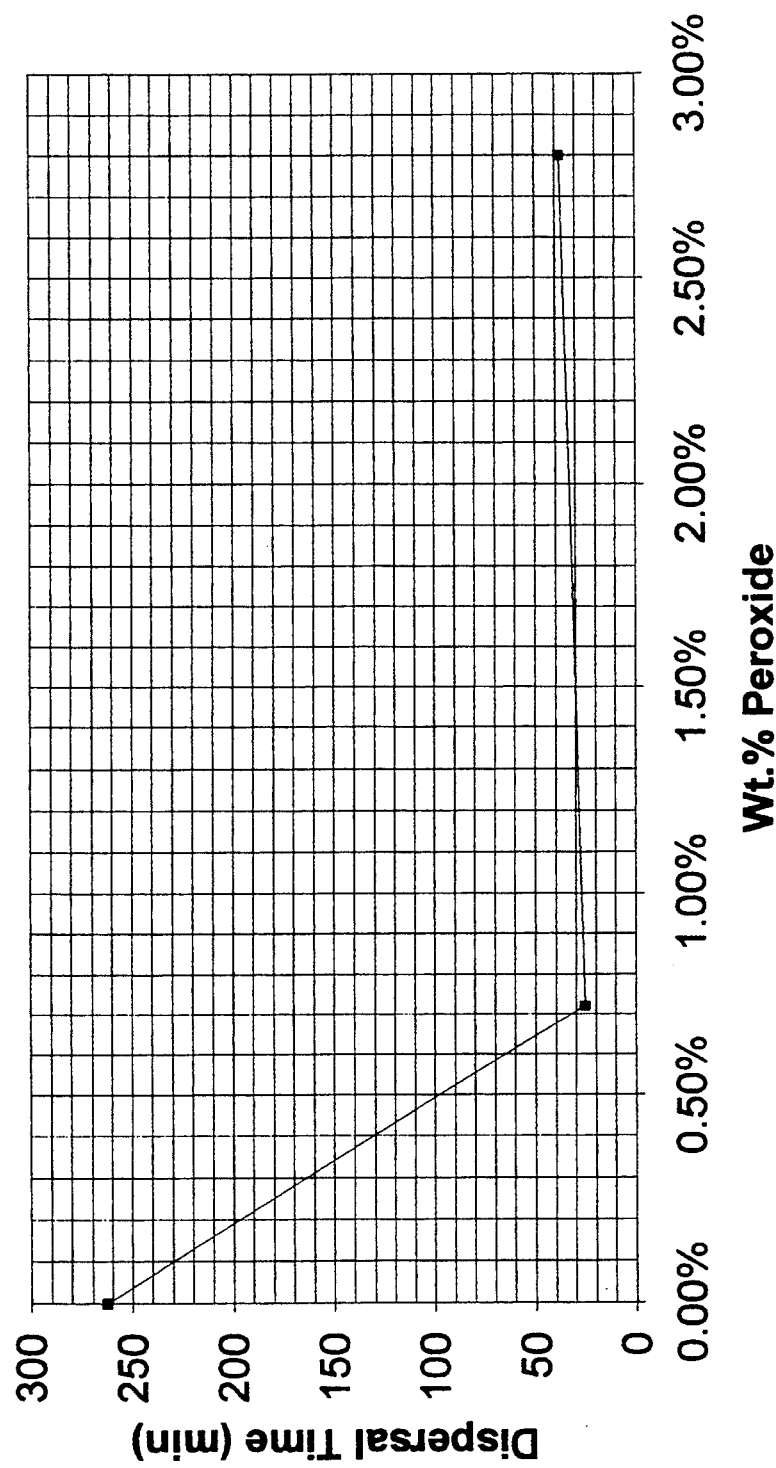

The results of the dispersal times for formulations 9 and 9A-B (See FIG. 13) evidence that the addition of peroxide dramatically improves the water dispersibility of HPM binder containing formulations.

Figure 14:
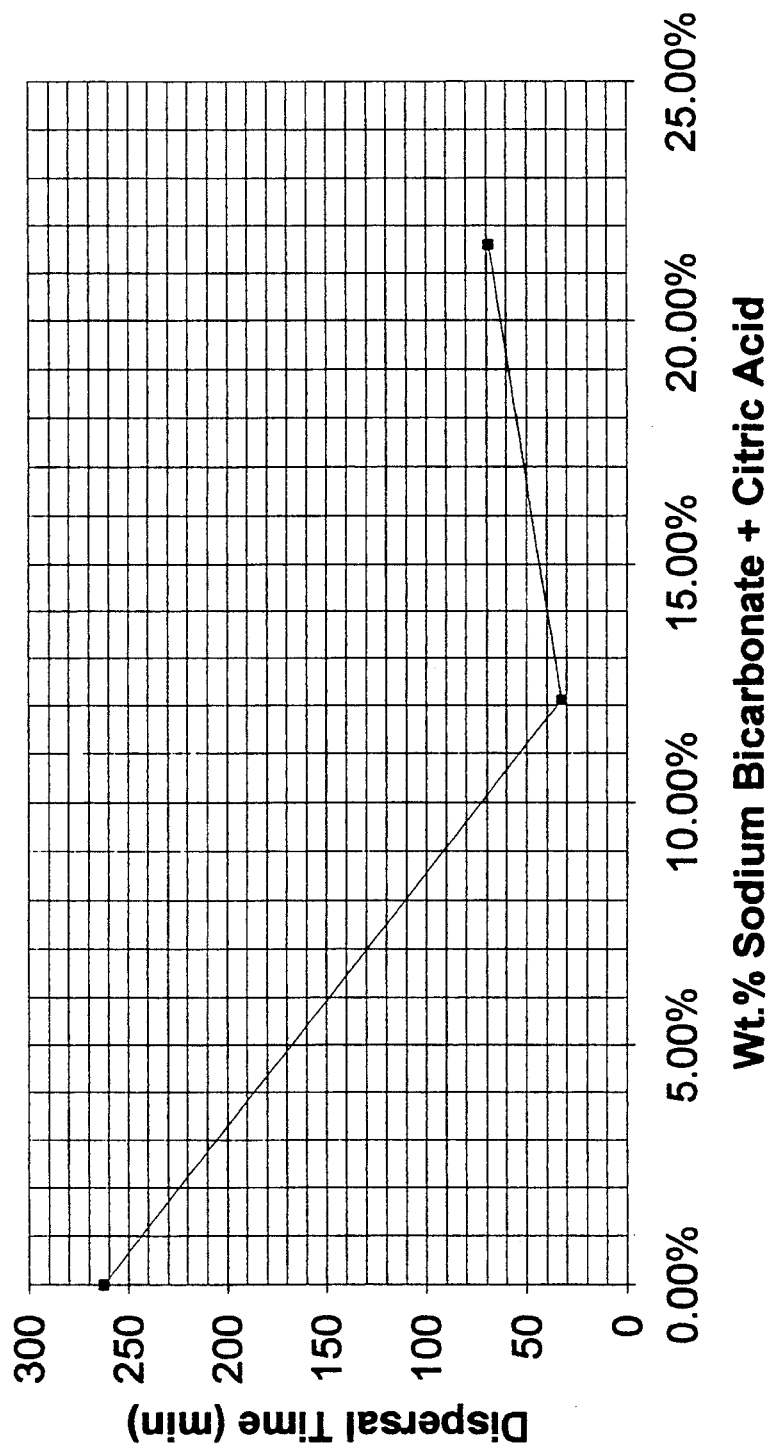

The results of the dispersal times for formulations 9 and 9C-D (See FIG. 14) evidence that the inclusion of a combination of sodium bicarbonate and citric acid will dramatically increase water dispersibility.

EXAMPLE 9

Effect of Gas Releasing Agents on Dispersal Time of HPC Containing Formulation

Sample formulation 10 (from Example 4) was modified to contain gas releasing agents as set forth in Table 11, below. Sample formulation 10 was used to produce 5 samples (10A–10E) having varying concentrations of peroxide or sodium bicarbonate/citric acid as set forth in Table 14. These sample formulations were then tested using the general methodology to determine water dispersbility.

TABLE 14

| HPC Formulations-Effects of Gas Releasing Agents | | | | | | |
|---|---|---|---|---|---|---|
| Sample # | 10 | 10A | 10B | 10C | 10D | 10E |
| Short Fibers (Grams) | | | | | | |
| SF 900 (110 Micr.) | 7.5 | 7.5 | 7.5 | 7.5 | 7.5 | 7.5 |
| SF 1016 (280 Mic.) | 7.5 | 7.5 | 7.5 | 7.5 | 7.5 | 7.5 |
| SF % of Total Fibers | 60 | 60 | 60 | 60 | 60 | 60 |
| Long Fibers (Grams) | 10 | 10 | 10 | 10 | 10 | 10 |
| Softwood Pulp | | | | | | |
| LF % of Total Fibers | 40 | 40 | 40 | 40 | 40 | 40 |
| HPC Binder | 4 | 4 | 4 | 4 | 4 | 4 |
| % Binder of Solids | 13.79 | 13.75 | 13.72 | 13.5 | 13.3 | 12.9 |
| Peroxide (3%) | | 3 | 5 | 20 | | |
| Sodium Bicarbonate | | | | | 1 | 2 |
| Acetic Acid | | | | | 1 | 2 |
| Modifier % of Dry Wt. | | 0.43% | 0.72 | 2.8 | 6.06 | 12.12 |
| TOTAL WATER | 65 | 62 | 60 | 45 | 65 | 65 |

After formulation, the above six sample formulations were then dispersed in water using the general method set forth above (See Table 15, below).

TABLE 15

| Dispersal Times of HPC Formulations | | | | | | |
|---|---|---|---|---|---|---|
| Sample # | 10 | 10A | 10B | 10C | 10D | 10E |
| Thickness | 0.102 | 0.131 | 0.127 | 0.132 | 0.108 | 0.118 |
| Water Temp. | 47–48 | 45–48 | 48 | 47–48 | 46–49 | 45–49 |
| Volume (ml) | 350 | 350 | 350 | 350 | 350 | 350 |
| Agitation Speed | 4 | 4 | 4 | 4 | 4 | 4 |
| Weight (g. Avg) | 1.91 | 1.94 | 1.88 | 1.96 | 2.06 | 2.24 |
| Time (min.) | 15.9 | 10.3 | 19.3 | 24.4 | 12.15 | 19.2 |

Figure 15:
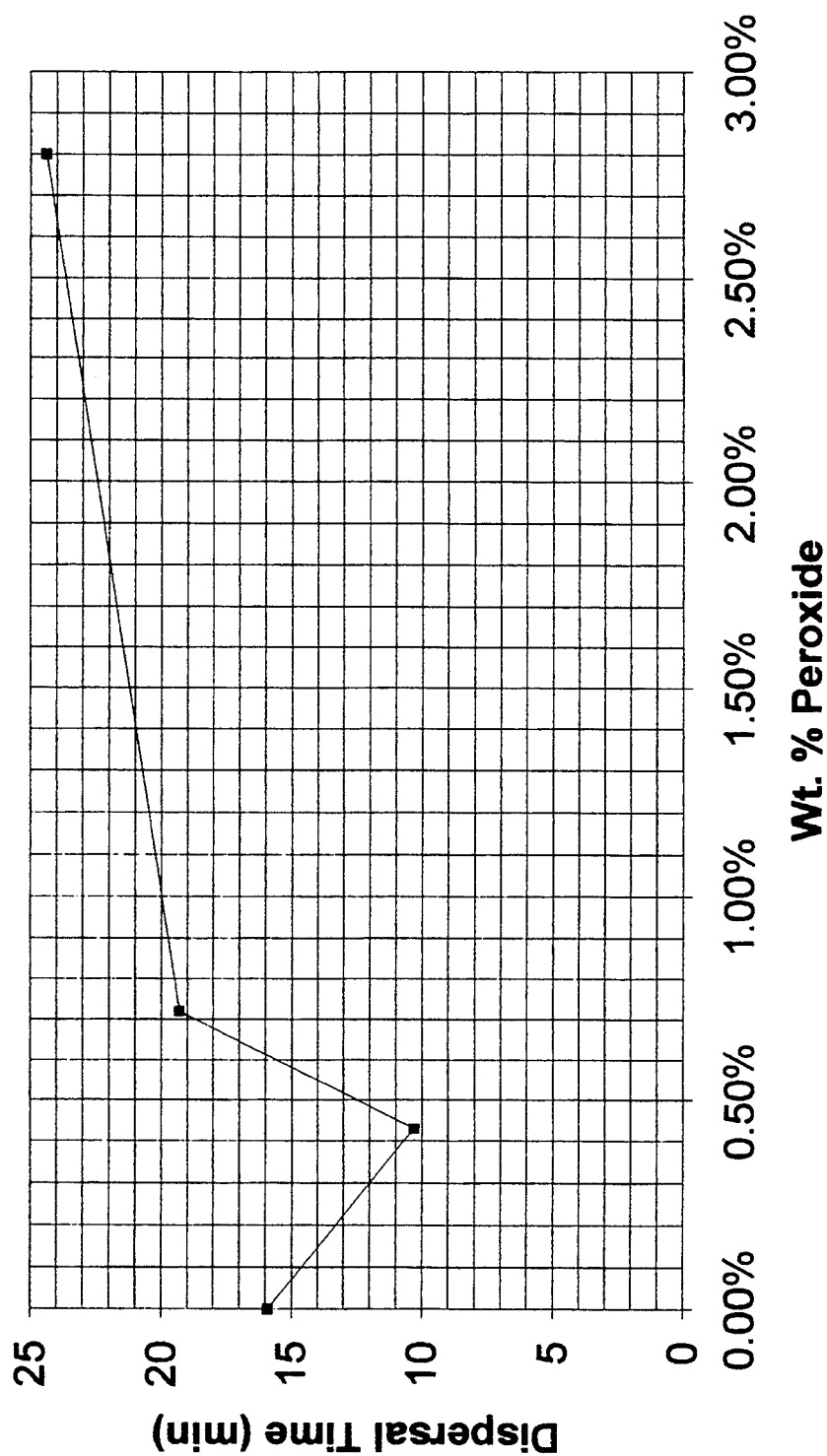

The results of the dispersal times for formulations 10 and 10A–C (See FIG. 15) evidence that the addition of peroxide significantly improves the water dispersibility of HPC binder containing formulations. These results are consistent with the general effects we see for gas releasing agents with the cellulose binders used in the present invention, including carboxymethylcellulose. We note that other results (at higher peroxide content) indicate that in HPC binders, the peroxide effect may be diminished relative to other cellulose ether binders employed.

Figure 16:
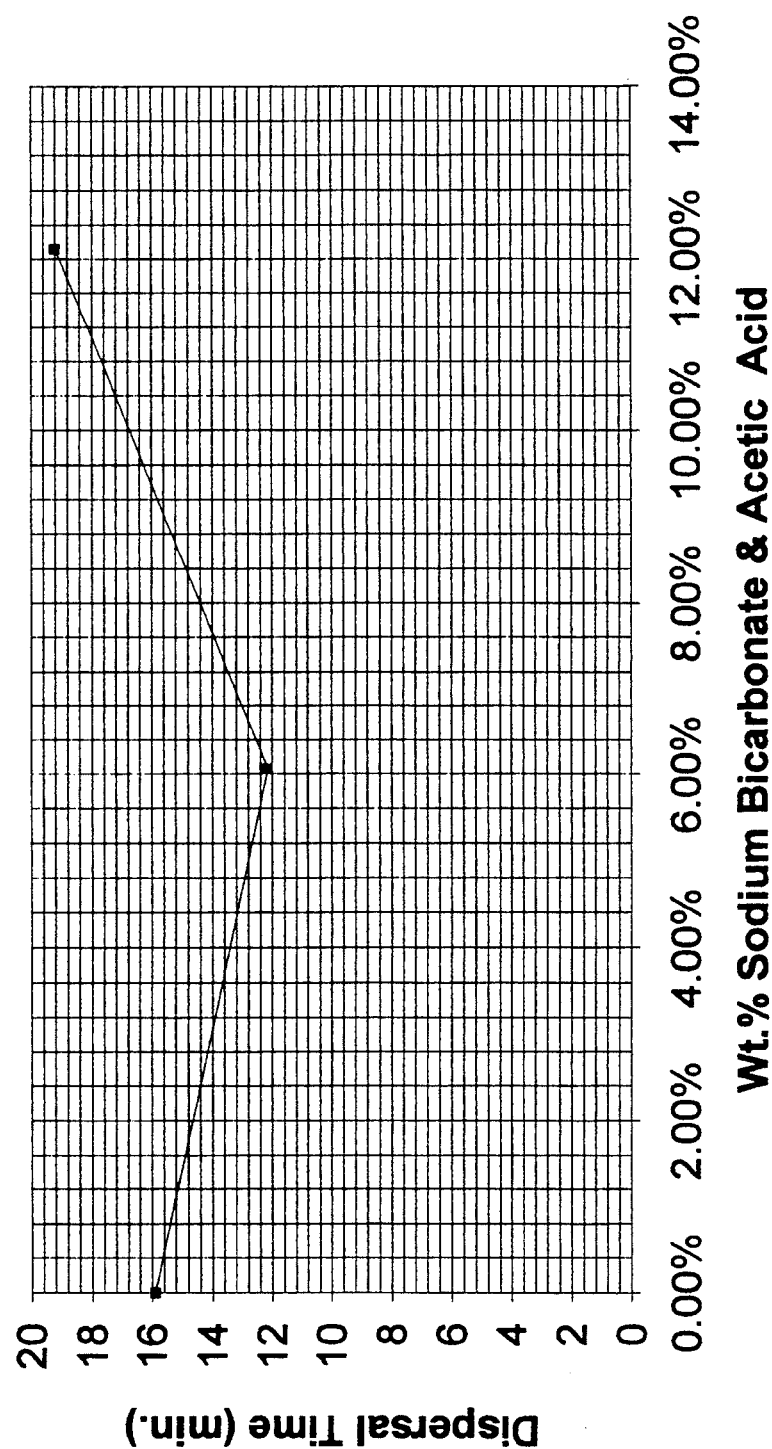

The results of the dispersal times for formulations 10 and 10D-E (See FIG. 16) evidence that the inclusion of a combination of sodium bicarbonate and a sufficiently strong acid will increase water dispersibility. We note that acetic acid was substituted for citric acid in this experiment to promote water dispersibility. It is noted that other results with HPC binder indicate that the effect on water dispersibility by sodium bicarbonate and citric acid appears to be pH and concentration of bicarbonate/citric acid dependent; in order to maximize $CO_2$ release from the bicarbonate, the pH must be sufficiently acidic. This will drive the formation of $CO_2$. The effect also appears to be dependent upon the concentration of bicarbonate and the type of acid used. The use of HPC as a binder produces an inhibition of water dispersibility at a lower concentration of bicarbonate and citric acid than other cellulose binders. This is believed to be related to the liquid crystalline structure of HPC which produces a ceramic-like effect at lower concentrations of bicarbonate and citric acid.

EXAMPLE 10

Effect of Gas Releasing Agents on Dispersal Time of HEC Containing Formulation

Sample formulation 11 (from Example 4) was modified to contain gas releasing agents as set forth in Table 16, below. Sample 11 was used to produce 4 samples (11A–11D) having varying concentrations of peroxide or sodium bicarbonate/citric acid as set forth in Table 16. These sample formulations were then tested using the general methodology to determine water dispersbility.

TABLE 16

| HEC Formulations-Effects of Gas Releasing Agents | | | | | |
|---|---|---|---|---|---|
| Sample # | 11 | 11A | 11B | 11C | 11D |
| Short Fibers (Grams) | | | | | |
| SF 900 (110 Micr.) | 7.5 | 7.5 | 7.5 | 7.5 | 7.5 |
| SF 1016 (280 Mic.) | 7.5 | 7.5 | 7.5 | 7.5 | 7.5 |
| SF % of Total Fibers | 60 | 60 | 60 | 60 | 60 |
| Long Fibers (Grams) | 10 | 10 | 10 | 10 | 10 |
| Softwood Pulp | | | | | |
| LF % of Total Fibers | 40 | 40 | 40 | 40 | 40 |
| HPC Binder | 2 | 2 | 2 | 2 | 2 |
| % Binder of Solids | 7.4 | 7.2 | 7.3 | 6.7 | 6.9 |
| Peroxide (3%) | | | 28 | 18 | |

TABLE 16-continued

| HEC Formulations-Effects of Gas Releasing Agents | | | | | |
|---|---|---|---|---|---|
| Sample # | 11 | 11A | 11B | 11C | 11D |
| Sodium Bicarbonate | | | | 1.9 | 0.95 |
| Citric Acid | | | | 1.9 | 0.95 |
| Modifier % of Dry Wt. | 0 | 4.17% | 2.7 | 12.33 | 6.57 |
| TOTAL WATER | 65 | 37 | 47 | 65 | 65 |

After formulation, the above five sample formulations were then dispersed in water using the general method set forth above (See Table 17).

TABLE 17

| Dispersal Times of HEC Formulations | | | | | |
|---|---|---|---|---|---|
| Sample # | 11 | 11A | 11B | 11C | 11D |
| Thickness | 0.119 | 0.114 | 0.119 | 0.119 | 0.109 |
| Water Temp. | 47–48 | 47–48 | 47–49 | 46–48 | 46–49 |
| Volume (ml) | 350 | 350 | 350 | 350 | 350 |
| Agitation Speed | 4 | 4 | 4 | 4 | 4 |
| Weight (g. Avg) | 1.85 | 1.64 | 1.54 | 2.055 | 3.0 |
| Time (min.) | 16.1 | 20 | 20.6 | 30.6. | 24.85 |

Figure 17:
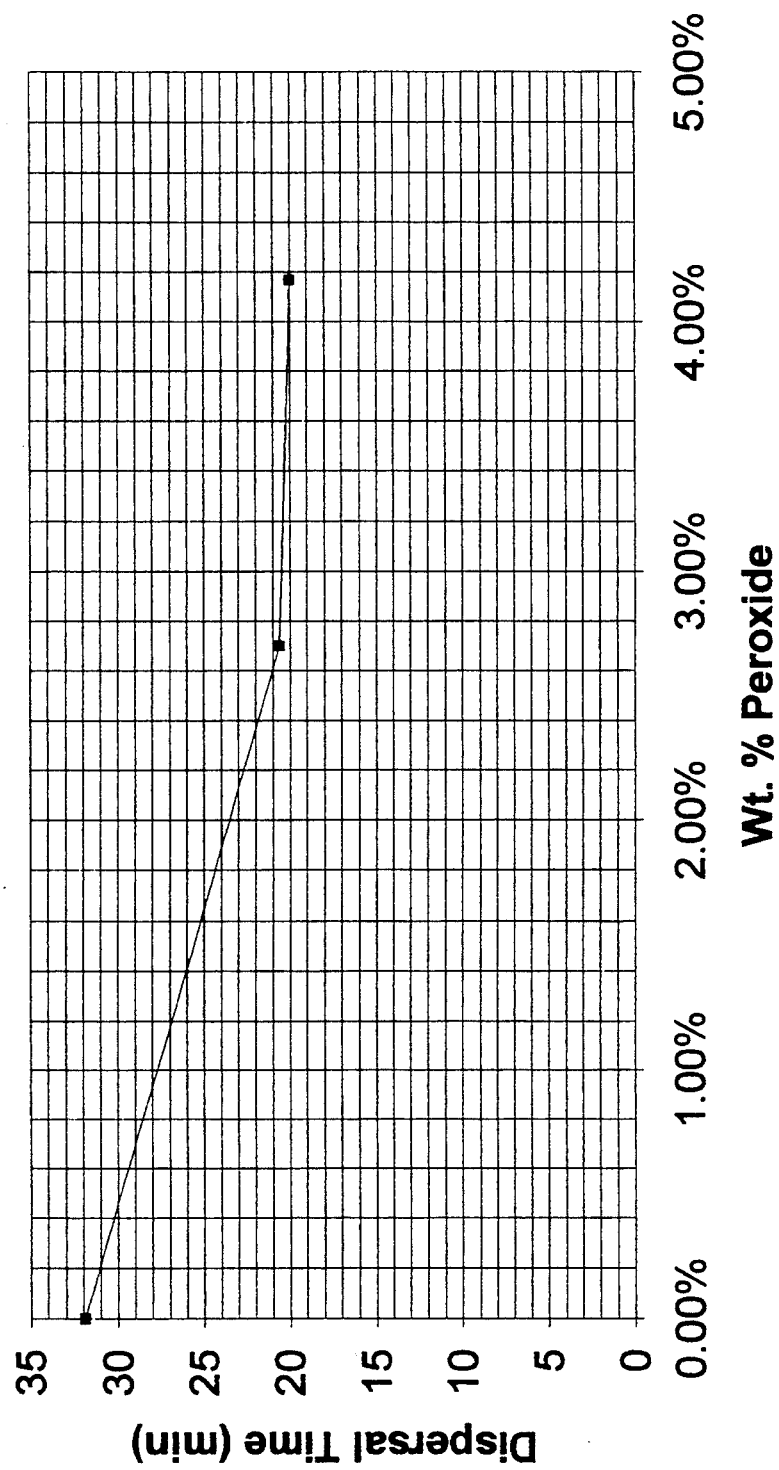

The results of the dispersal times for formulations 11 and 11A-B (See FIG. 17) evidence that the addition of peroxide significantly improves the water dispersibility of HEC binder containing formulations.

The results of the dispersal times for formulations 11 and 11C-D (See FIG. 18) evidence that the inclusion of a combination of sodium bicarbonate and citric acid will increase water dispersibility.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A water-dispersible formulation for use in manufacturing water dispersible materials consisting essentially of about 1% to about 90% by weight of a water dispersible cellulose ether binder; about 10% to about 98.99% by weight cellulose fibers and about 0.01% to about 30% by weight of a gas releasing agent, said cellulose fibers being randomly dispersed throughout said cellulose ether binder.

2. The formulation according to claim 1 wherein said water dispersible cellulose ether is selected from the group consisting of carboxymethylcellulose, hydroxypropylcellulose, hydroxypropylmethylcellulose, hydroxyethylcellulose, methylcellulose, hydroxymethylethylcellulose and carboxymethylhydroxyethylcellulose.

3. The formulation according to claim 2 wherein said cellulose ether binder comprises about 3% to about 62% by weight of said formulation and said gas releasing agent comprises about 0.1% to about 15% by weight of said formulation.

4. The formulation according to claim 1 wherein said cellulose fibers comprise a mixture of long and short fibers, said long fibers being more than about 300 microns in length and said short fibers being less than about 300 microns in length.

5. The formulation according to claim 1 wherein said gas releasing agent is hydrogen peroxide.

6. The formulation according to claim 1 wherein said gas releasing agent is sodium or potassium bicarbonate in combination with a biodegradable organic acid, the molar ratio of bicarbonate to organic acid ranging from about 1:10 to about 10:1.

7. The formulation according to claim 1 further including at least one inert filler, plasticizer, crosslinking agent or surfactant.

8. A water-dispersible formulation for use in manufacturing containers consisting essentially of about 1% to about 90% by weight of a water soluble cellulose ether binder; about 10% to about 98.99% by weight cellulose fibers and about 0.01% to about 30% by weight of a gas releasing agent, said cellulose fibers comprising a mixture of short and long cellulose fibers, said cellulose fibers being randomly dispersed throughout said cellulose ether binder, said long fibers being more than about 300 microns in length and said short fibers being less than about 300 microns in length.

9. The formulation according to claim 8 wherein said short cellulose fibers range in length from about 22 microns to about 280 microns in length.

10. The formulation according to claim 8 wherein said long cellulose fibers range in size from about 300 microns to about 2 mm.

11. The formulation according to claim 8 wherein said long cellulose fibers comprise at least about 50% by weight of said cellulose fibers in said formulation.

12. The formulation according to claim 8 wherein said water dispersible cellulose ether is selected from the group consisting of carboxymethylcellulose, hydroxypropylcellulose, hydroxypropylmethylcellulose, hydroxyethylcellulose, methylcellulose, hydroxymethylethylcellulose and carboxylmethylhydroxyethylcellulose.

13. The formulation according to claim 8 wherein said cellulose ether binder comprises about 2% to about 30% by weight of said formulation.

14. The formulation according to claim 8 wherein said gas releasing agent is selected from the group consisting of peroxides, bicarbonate salts and carbonate salts.

15. The formulation according to claim 14 wherein said gas releasing agent is hydrogen peroxide.

16. The formulation according to claim 8 wherein said gas releasing agent is sodium or potassium bicarbonate in combination with a biodegradable organic acid, the molar ratio of bicarbonate to organic acid ranging from about 1:10 to about 10:1.

17. The formulation according to claim 16 wherein said molar ratio is 1:1.

18. The formulation according to claim 8 wherein said cellulose ether binder is carboxymethylcellulose or carboxymethylhydroxyethylcellulose and said gas releasing agent is hydrogen peroxide, said hydrogen peroxide comprising no greater than about 20% by weight of said binder.

19. The formulation according to claim 8 optionally including at least one inert filler, plasticizer, crosslinking agent or surfactant.

20. A water-dispersible formulation for use in manufacturing water dispersible materials consisting essentially of about 70% to about 99.99% by weight of a water dispersible cellulose ether binder and about 0.01% to about 30% by weight of a gas releasing agent.

21. The formulation according to claim 20 wherein said gas releasing agent is selected from the group consisting of peroxides, bicarbonate salts and carbonate salts.

22. The formulation according to claim 20 wherein said gas releasing agent is hydrogen peroxide.

23. The formulation according to claim 20 wherein said gas releasing agent is sodium or potassium bicarbonate in combination with a biodegradable organic acid, the molar ratio of bicarbonate to organic acid ranging from about 1:10 to about 10:1.

24. The formulation according to claim 20 further including at least one inert filler, plasticizer, crosslinking agent or surfactant.

25. A method of increasing the water dispersibility of a formulation used in the manufacture of water dispersible materials, said formulation consisting essentially of about 1% to about 90% by weight of a water dispersible cellulose ether binder and about 10% to about 99% by weight of cellulose fibers comprising a mixture of long and short cellulose fibers, said long fibers being more than about 300 microns in length and said short fibers being less than about 300 microns in length, said cellulose fibers being randomly dispersed throughout said cellulose ether binder, said method comprising adding effective amounts of additional long cellulose fibers to said formulation to increase water dispersibility.

26. The method according to claim 25 wherein said water dispersible cellulose ether is selected from the group consisting of carboxymethylcellulose, hydroxypropylcellulose, hydroxypropylmethylcellulose, hydroxyethylcellulose, methylcellulose, hydroxymethylethylcellulose and carboxylmethylhydroxyethylcellulose.

27. The method according to claim 25 wherein said formulation includes at least one inert filler, plasticizer, crosslinking agent or surfactant.

28. A method of decreasing the water dispersibility of a formulation used in the manufacture of water dispersible materials, said formulation consisting essentially of about 1% to about 90% by weight of a water dispersible cellulose ether binder and about 10% to about 99% by weight of a mixture of long and short cellulose fibers, said long fibers being more than about 300 microns in length and said short fibers being less than about 300 microns in length, said cellulose fibers being randomly dispersed throughout said cellulose ether binder, said method comprising adding effective amounts of additional short cellulose fibers in said mixture of cellulose fibers of said formulation to decrease water dispersibility.

29. The method according to claim 28 wherein said water dispersible cellulose ether is selected from the group consisting of carboxymethylcellulose, hydroxypropylcellulose, hydroxypropylmethylcellulose, hydroxyethylcellulose, methylcellulose, hydroxymethylethylcellulose and carboxymethylhydroxyethylcellulose.

30. The method according to claim 28 wherein said formulation includes at least one inert filler, plasticizer, crosslinking agent or surfactant.

31. A method of increasing the water dispersibility of a formulation used in the manufacture of water dispersible materials, said formulation comprising about 1% to about 90% by weight of a water dispersible cellulose ether binder and about 10% to about 98.98% by weight cellulose fibers comprising a mixture of long and short cellulose fibers, said long fibers being more than about 300 microns in length and said short fibers being less than about 300 microns in length, and at least about 0.01% to about 30% by weight of a gas releasing agent, said cellulose fibers being randomly dispersed throughout said cellulose ether binder, said method comprising adding effective amounts of additional long cellulose fibers to said formulation to increase water dispersibility.

32. A method of increasing the water dispersibility of a formulation used in the manufacture of water dispersible materials, said formulation comprising about 1% to about 90% by weight of a water dispersible cellulose ether binder, about 10% to about 98.99% by weight cellulose fibers said cellulose fibers being selected from the group consisting of long cellulose fibers, short cellulose fibers and mixtures thereof, and an amount of water effective to thoroughly mix said cellulose ether and said cellulose fibers into a dough, said cellulose fibers being randomly dispersed throughout said cellulose ether binder, said method comprising adding about 0.01% to about 30% by weight of a gas releasing agent to said formulation and thereafter subjected said formulation to a mixing action or to heat at a temperature below about 140° C. to produce a foaming action before drying said formulation to remove said water.

33. The method according to claim 32 wherein said water dispersible cellulose ether is selected from the group consisting of carboxymethylcellulose, hydroxypropylcellulose, hydroxypropylmethylcellulose, hydroxyethylcellulose, methylcellulose, hydroxymethylethylcellulose and carboxylmethylhydroxyethylcellulose.

34. The method according to claim 33 wherein said cellulose ether binder comprises about 3% to about 62% by weight of said formulation.

35. The method according to claim 32 wherein said cellulose ether binder comprises about 2% to about 30% by weight of said formulation.

36. The method according to claim 32 wherein said cellulose fibers comprise a mixture of long and short fibers.

37. The method according to claim 32 wherein said gas releasing agent is selected from the group consisting of peroxides, bicarbonate salts and carbonate salts.

38. The method according to claim 32 wherein said gas releasing agent is hydrogen peroxide.

39. The method according to claim 32 wherein said gas releasing agent is sodium or potassium bicarbonate in combination with a biodegradable organic acid, the molar ratio of bicarbonate to organic acid ranging from about 1:10 to about 10:1.

40. The method according to claim 39 wherein said molar ratio is 1:1.

41. The method according to claim 32 wherein said cellulose ether binder is carboxymethylcellulose or carboxymethylhydroxyethylcellulose and said gas releasing agent is hydrogen peroxide, said hydrogen peroxide comprising no greater than about 20% by weight of said binder.

42. The method according to claim 32 wherein said formulation further includes at least one inert filler, plasticizer, crosslinking agent or surfactant.

43. A method of increasing the water dispersibility of a formulation used in the manufacture of water dispersible materials, said formulation consisting essentially of about 70% to about 99.99% by weight of a water dispersible cellulose ether binder, about 0.01% to about 30% by weight of a gas releasing agent and an amount of water effective to thoroughly mix said cellulose ether binder and said gas releasing agent, said method comprising subjecting said formulation to a mixing action or to heat at a temperature below about 140° C. to induce said gas releasing agent to release gas before drying said formulation to remove said water.

* * * * *